US007013364B2

(12) United States Patent
Honda et al.

(10) Patent No.: US 7,013,364 B2
(45) Date of Patent: Mar. 14, 2006

(54) STORAGE SUBSYSTEM HAVING PLURAL STORAGE SYSTEMS AND STORAGE SELECTOR FOR SELECTING ONE OF THE STORAGE SYSTEMS TO PROCESS AN ACCESS REQUEST

(75) Inventors: Kiyoshi Honda, Yokohama (JP); Masatoshi Nishina, Oiso (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 10/373,018

(22) Filed: Feb. 26, 2003

(65) Prior Publication Data

US 2003/0221064 A1    Nov. 27, 2003

(30) Foreign Application Priority Data

May 27, 2002  (JP)  ............................. 2002-151708
Oct. 22, 2002  (JP)  ............................. 2002-306468

(51) Int. Cl.
G06F 12/00  (2006.01)
(52) U.S. Cl. ...................................................... 711/114
(58) Field of Classification Search ................ 711/111, 711/112, 113, 114
See application file for complete search history.

(56) References Cited

U.S. PATENT DOCUMENTS 6,202,135 B1 * 3/2001 Kedem et al. .............. 711/162
6,792,503 B1 * 9/2004 Yagi et al. .................. 711/112
2001/0042222 A1 * 11/2001 Kedem et al. .................. 714/6
2001/0047462 A1 * 11/2001 Dimitroff et al. ........... 711/162
2002/0069320 A1 * 6/2002 Yagi et al. .................. 711/112

FOREIGN PATENT DOCUMENTS

JP          7-261946       10/1995

OTHER PUBLICATIONS

D.A. Patterson et al., A Case for Redundant Arrays of Inexpensive Disks (RAID), Proceedings of ACM SIGMOD, 1988, pp. 1-23.

* cited by examiner

*Primary Examiner*—Kevin Verbrugge
(74) *Attorney, Agent, or Firm*—Mattingly, Stanger, Malur & Brundidge, P.C.

(57) ABSTRACT

A storage subsystem of a control type holding redundant data wherein an access request from an upper-level device on a file basis is processed cooperatively by a plurality of storage systems forming the storage subsystem. To this end, each of the storage systems forming the storage subsystem has an element for processing the access request from the upper-level device on a file basis and updating the redundant data involved by the access request. Further, the storage system has an element for holding positional information on a recording medium for each file to be stored in its own and access history information, and rearranging storage areas under arbitrary conditions.

24 Claims, 22 Drawing Sheets

FIG.3

| STORAGE SUBSYSTEM MANAGEMENT INFORMATION | | STORAGE SYSTEM #1 | STORAGE SYSTEM #2 | STORAGE SYSTEM #3 | STORAGE SYSTEM #4 |
|---|---|---|---|---|---|
| STORAGE SYSTEM FLAG | | - | - | - | FLAG |
| STORAGE SYSTEM ID (UNIQUE ID) | | ID_1 | ID_2 | ID_3 | ID_4 |
| STORAGE DATA TYPE (DATA/REDUNDANT) | | DATA | DATA | DATA | REDUNDANT |
| REDUNDANT MANAGEMENT INFORMATION | DATA STORAGE SYSTEM ID | - | - | - | ID_1/2/3 |
| | REDUNDANT DATA STORAGE SYSTEM ID | ID_4 | ID_4 | ID_4 | - |
| | OPERATIONAL MODE (NORMAL/DEGRADATED) | NORMAL | NORMAL | NORMAL | NORMAL |
| | FAULTY STORAGE SYSTEM ID | - | - | - | - |
| | REDUNDANT DATA MANAGEMENT SIZE | 64KB | 64KB | 64KB | 64KB |
| | RAID LEVEL | RAID5 | ↓ | ↓ | ↓ |
| | DATA STORAGE SYSTEM NUMBER | 3 | ↓ | ↓ | ↓ |
| | PARITY STORAGE SYSTEM NUMBER | 1 | ↓ | ↓ | ↓ |
| | PARITY ARRANGEMENT SCHEME | CONVENTIONAL | ↓ | ↓ | ↓ |

STORAGE SUBSYSTEM HAVING PLURAL STORAGE SYSTEMS AND STORAGE SELECTOR FOR SELECTING ONE OF THE STORAGE SYSTEMS TO PROCESS AN ACCESS REQUEST

CROSS-REFERENCES TO RELATED APPLICATIONS

This application is related to copending application Ser. No. 10/082,303 filed Feb. 26, 2002, commonly assigned with the present invention.

BACKGROUND OF THE INVENTION

The present invention relates to a storage subsystem which includes a plurality of storage systems to hold redundant data, and a storage system for use in the storage subsystem.

A common storage subsystem includes a plurality of storage systems and a storage controller connected with the plurality of storage systems for controlling the systems. The storage controller divides user data and redundant data into sizes (blocks) of a fixed length, stores as distributed or broadcast the blocks to the respective storage systems and stores the block therein. This type of technique is disclosed, for example, in D. A. Patterson, et al. A Case for Redundant Arrays of Inexpensive Disks (RAID), pp. 1–23 (Proceedings of ACM SIGMOD, 1988). In this disclosure, a storage controller is connected with storage systems via respective interfaces such as SCSI's (Small Computer System Interfaces) for data transfer on a block basis. And the storage systems, when receiving such broadcast block data as mentioned above, independently execute reading/writing operation over the broadcast block data to thereby realize an improvement in performance by multiplexing.

The storage controller includes, at least, a device for controlling an interface with an upper-level device to control data exchange between the storage systems and upper-level device, a device for controlling the interfaces with the storage systems, a cache memory for holding data to be transferred between the upper-level device and storage systems, and a device for integrally controlling these elements. The storage controller performs various operations including dividing operation to blocks for data exchange between the upper-level device and storage systems, block broadcasting operation to the storage systems and converting operation to file data for the upper-level device. Controls to these storage systems are carried out collectively by the storage controller. For this reason, the storage controller is required to process a massive amount of data at a high speed, to which end a high-speed and expensive processor or a large capacity of cache memory is usually mounted, thus realizing a performance improvement.

As another performance improving technique in the storage subsystem, there is considered a technique wherein the operation of creating redundant data at the time of data updating is carried out by one of the storage systems for its data to be updated in order to lighten the burden of the storage controller (e.g., JP-A-7-261946).

In the aforementioned related storage subsystem, various accesses control to the storage systems including data conversion of an access request of a file unit received by the storage controller from the upper-level device into data of a block unit as the processing unit of the storage system, or allocation of the converted block data to the storage systems are concentrated. For this reason, upon newly reading or writing data, the processing performance of the storage controller becomes a bottleneck and an improvement in the entire processing performance of the storage subsystem can be impeded.

Further, for the purpose of increasing the performance of the storage subsystem, this has been attained by preparing a highest performance of processor or a large capacity of cache memory and providing it in the storage controller. This, however, results in that the storage subsystem is increased in its price.

These years, such a storage subsystem tends to increase the number of storage systems included therein, the current situations spurs the above tendency. Even when the above highest performance of processor or the like is prepared, this will be considered to impede the improvement of the processing performance of the storage subsystem.

Further, areas specified by the storage controller as contiguous or continuous areas may sometimes be actually discontinuous. In such a case, even when the storage controller issues an access request indicative of the specification of the continuous areas, actual storage system's access is done to the discontinuous areas, thus resulting in that it takes a lot of time to wait for seek operation or disk rotation and an access performance is decreased. In the related art, no consideration is paid to how to suitably store data when the areas specified by the storage controller as continuous areas is actually discontinuous areas.

SUMMARY OF THE INVENTION

It is therefore an object of the present invention to provide a storage subsystem which can lighten the burden of a storage controller on which a load, when the subsystem responds to an access request of a file unit from an upper-level device, has been so far concentrated, thereby improving the performance of the storage subsystem and lowering the price thereof.

Another object of the present invention is to provide one of storage systems forming a storage subsystem, which responds to an access request of a file unit from an upper-level device and optimumly controls storage areas for block data of a file.

The above objects are attained by providing means for processing an access request of a file unit to each of storage systems forming a storage subsystem and by providing a storage selector for selecting one of the storage systems to process the access request received from an upper-level device and sending the access request to the selected storage system to the storage controller or at least one of the storage systems.

When the above means is provided to the storage systems and storage controller, the need for the storage controller to perform all or part of the file conversion to block data to process the access request of a file unit, the allocation of the converted block data to one of the storage systems to be accessed, and the control of the storage system to read out the block data can be eliminated. As a result, the burden of the storage controller in the access request processing can be lightened and the performance of the storage subsystem can be increased. In this connection, when the above storage system is provided to one of the storage systems, there can be provided a storage subsystem which has no storage controller.

Further, the storage system usually stores data in a media section on a block basis. However, when the access request is a request of reading out data stored in the media section, a main controller for controlling the storage system converts the data of a block unit stored in the media section into data of a file unit and outputs the converted data to the request originator. When the access request is a request of writing data, the main controller converts data of a file unit externally received into data of a block unit and stores the converted data in the media section. As a result, the storage system having the media section for usually storing data on a block basis can process an access request of data of a file unit.

Further, since the main controller of the storage system, when writing data, performs its controlling operation in such a manner that data divided into block units are stored in areas of the continuously-accessible media section, thus shortening a write time from the media section. Not only in the data write mode, but the main controller also can rearrange data stored in discontinuous areas by detecting the address of the leading block of the data and the number of blocks continuous in the leading block.

In accordance with the present invention, the storage subsystem can lighten the load of the storage controller regarding to the response to the access request of a file unit from the upper-level device, and can increase its performance and lower its price. Further, each of the storage systems included in the storage subsystem can cope with the access request of a file unit from the upper-level device and can optimumly control storage areas for the block data.

BRIEF DESCRIPTION OF THE DRAWINGS

FIG. 3 shows an exemplary structure of file management information in the first embodiment;

DETAILED DESCRIPTION OF THE EMBODIMENTS

[First Embodiment]

(Command Broadcasting by Storage Controller)

Explanation will be made as to a first embodiment of the present invention with reference to FIGS. 1 to 7.

Figure 1:
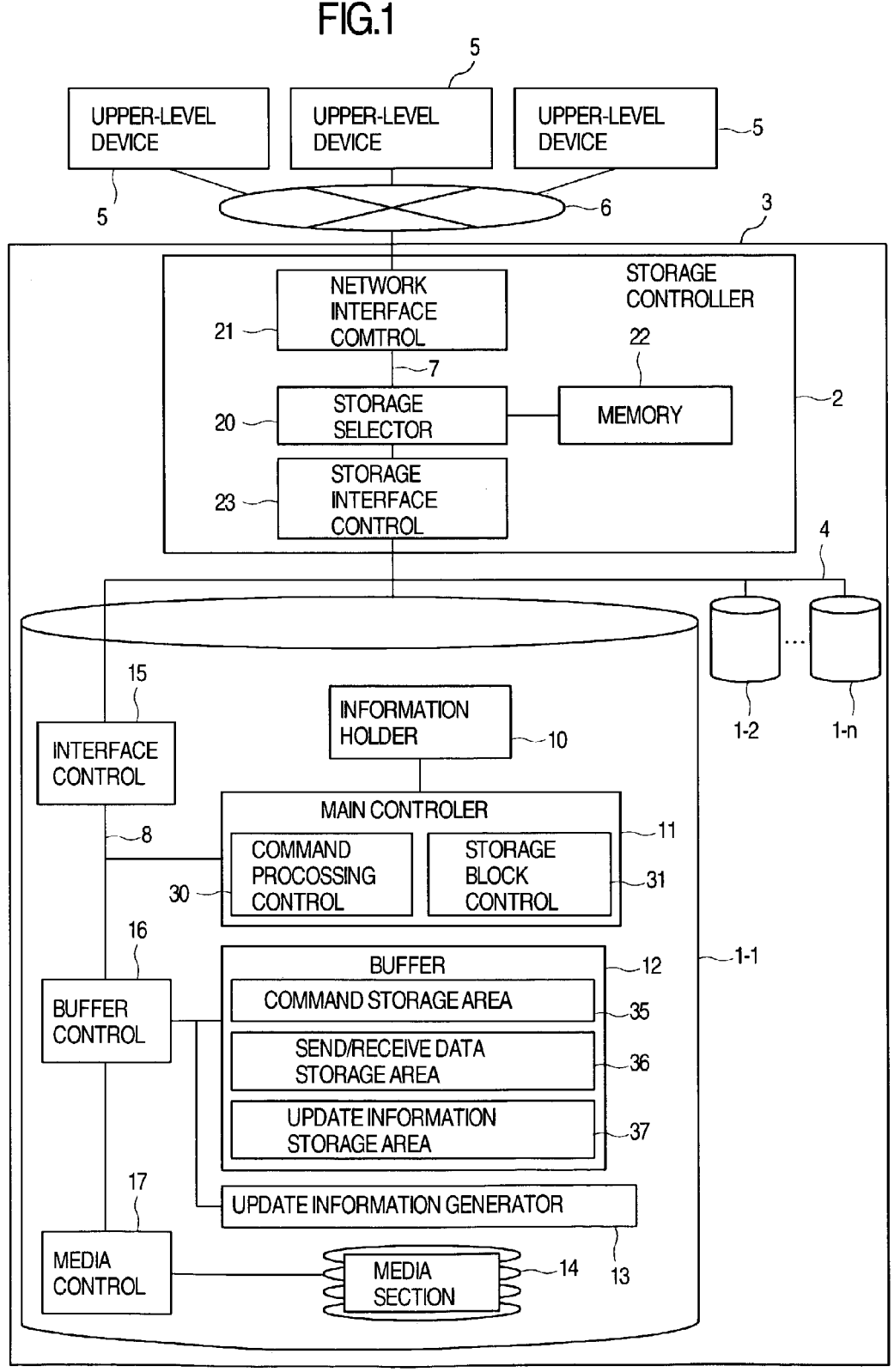
FIG. 1 shows an exemplary configuration of an information processing system.

FIG. 1 shows an exemplary information processing system which includes a storage subsystem 3 and a plurality of upper-level devices 5. The storage subsystem 3 has a storage controller 2 and a plurality of storage systems 1. Connected to the plurality of storage systems 1 are the storage controller 2 via an intra-subsystem network 4. The storage controller 2 is also connected to the upper-level devices 5 via a network 6.

The storage controller 2 has a storage selector 20, a network interface control 21, a memory 22, a storage interface control 23, and an intra-storage-controller network 7. The memory 22 has storage selector management information. The storage selector management information includes, as information for selecting a specific storage system, information for linking all files stored by the storage subsystem to the storage systems where files are actually stored, blank information (indicative of how much capacity of data can be still stored therein) on the respective storage systems, and information equivalent to the subsystem management information. In this connection, it is desirable that the memory 22 be of a nonvolatile type.

On the basis of the storage selector management information an access request of a file unit from the upper-level device 5 to the storage system 1, the storage controller 2 transmits the access request to the specific storage system 1. Hereinafter, an access request of a file unit from the upper-level device to the storage system will be referred to as the Cmd.

The storage system 1 has an information holder 10, a main controller 11, a buffer 12, an update information generator 13, a media section 14, an interface control 15, a buffer control 16, a media control 17, and an intra-storage-system network 8.

The information holder 10 stores the file management information, subsystem management information, media and management information therein, which will be detailed later.

The main controller 11 has a command processing control 30 and a storage block control 31, and functions to integrally control the storage systems. On the basis of the Cmd and information stored in the information holder 10, the command processing control 30 controls the operation to the Cmd. The storage block control 31 controls the optimum block detection and its allocating operation when the write data (referred to as the write data, hereinafter) received from the upper-level device 5 is stored in the media section 14 (to be explained later).

The buffer 12 has a command storage area 35, a send/receive data storage area 36 and an update information storage area 37. The buffer 12 is used to temporarily store data to be transferred between the media section 14 and upper-level device 5. The command storage area 35 holds the Cmd received from the upper-level device 5. The send/receive data storage area 36 holds data to be transferred to or from the upper-level device 5. The update information storage area 37 holds update information generated in the update information generator 13.

The update information generator 13 generates update information on the basis of a logical exclusive "OR" operation between the write data received from the upper-level device 5 and data to be updated in the media section 14 or the like.

The media section 14 is a recording media for holding data to be accessed by the upper-level device 5 or redundant data corresponding to the access data.

The interface control 15 controls communication with the storage selector 20 based on a predetermined protocol.

The buffer control 16 controls an access to the buffer 12.

The media control 17 executes the recording/reproducing operation to the media section 14.

Although the respective constituent elements are depicted as capable of being implemented in the form of hardware in FIG. 1, the processes of the command processing control 30 and storage block control 31 in the main controller 11 may be implemented in the form of software executed by a processor.

Figure 2:
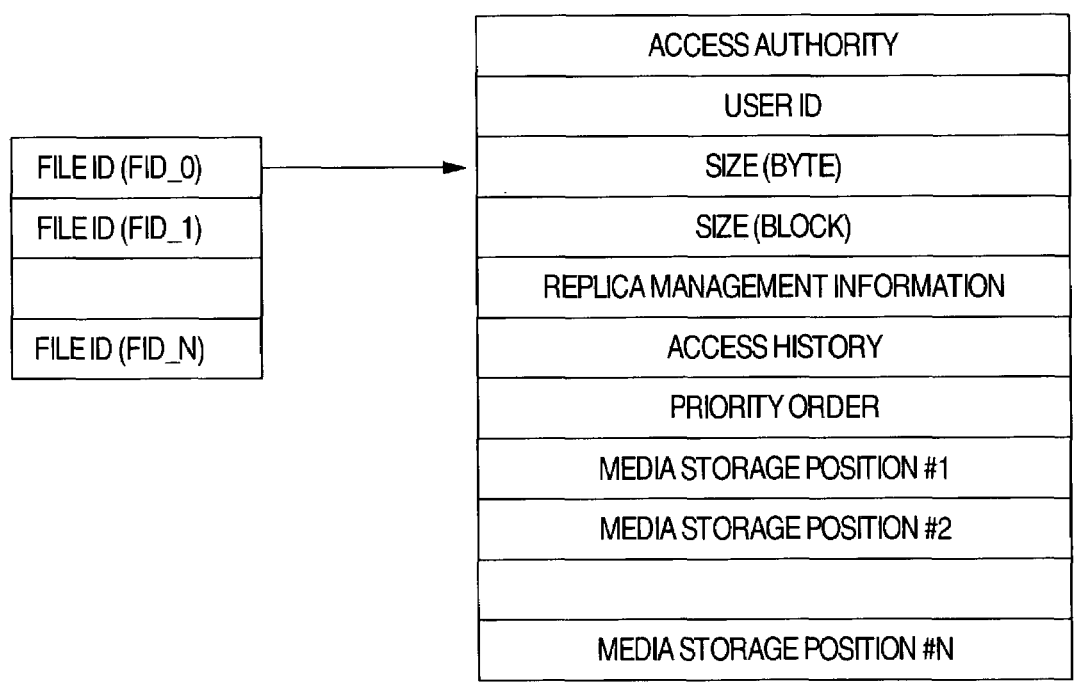
FIG. 2 shows an exemplary structure of a storage system in a first embodiment.

FIG. 2 shows an exemplary structure of the file management information stored in the information holder 10. The file management information includes file ID's for identification of files. Each file ID contains an access authority, a user ID, a size, a replica management information, an access history, priority order, a media storage position, etc.

The access authority is information indicative of whether or not the file can cope with a read or write request.

The user ID is an identifier for identifying the user.

The size includes the size (in byte units) of a file stored in the media section 14 and the number of blocks for the file.

The replica management information is information on the priority order applied to each storage system for responding an access request to the file. The replica management information may specify a storage having a file which is mirrored into a plurality of storages, for example. A previous determination of a request to read files 1 to 50 to be responded from one storage and a request to read files 51 to 100 to be responded from another storage will provide a load sharing of the accesses over the storages.

The access history is information used as an index of access frequency to the file, such as a period after the file was created or an access frequency in an arbitrary period.

The priority order is information to be specified when the upper-level device creates the file. For example, a high priority order is applied to a file having an access frequency high when viewed from the upper-level device, or to some files often accessed together with other files. Further, the user may previously set priority orders according to the importances of such files.

The media storage position includes the address of the leading block stored in the media section 14 and the number of continuous blocks. When file update or the like involves no reservation (generation of fragmentation or discontinuation) of continuous areas in the media section 14, information on the media storage position is added to each of the discontinuous areas. #1 to #N given in FIG. 2 are given to the respective discontinuous areas.

In this connection, these pieces of information in the file management information are not all indispensable. Necessary ones of the information pieces may be used according to the embodiment.

FIG. 3 shows an exemplary structure of subsystem management information stored in the information holder 10. In this case, the subsystem management information includes a storage system flag, a storage system ID, a storage data type and redundant management information.

The storage system flag indicates an identifier for one of a plurality of storage systems to be subjected to be selected in a second embodiment.

The storage system ID is an identifier unique to a storage system to identify the storage system.

The storage data type is information indicative of whether the stored data is user data or redundant data.

The redundant management information includes an data storage system ID, a redundant data storage system ID, an operational mode, a failed or faulty storage system ID, a RAID level, data storage system number, a parity storage system number, a parity allocation scheme and a redundant data management size. The data storage system ID is information indicative of one of the storage systems in which data corresponding to the stored redundant data is stored. The redundant data storage system ID is information indicative of one of the storage systems in which the redundant data corresponding to the stored data is stored. The operational mode is information indicative of the storage system is normal or degraded. The word "degraded" as used herein refers to such a state that the storage system is faulty and the Cmd is processed using the redundant data. The faulty storage system ID is information indicative of the ID of the storage system which became faulty. The redundant data management size is information indicative of the size of the redundant data. The RAID level indicates one of RAID types of RAID0 to RAID5. The data storage system number indicates the number of storage systems for data holding to create data in a parity group. The parity group means that, even when one of the storage systems became faulty, the group can restore the data. The parity storage system number indicates the number of storage systems for holding of the redundant data created based on the data stored in a plurality of storage systems. The parity storage system number is usually "1". The parity allocation scheme uses data indicating one of various known schemes for allocating parity data shifted among a plurality of storage systems in a sequential order.

In this connection, these pieces of information in the subsystem management information are not all indispensable but necessary ones of the information pieces may be used according to the embodiment.

The media management information stored in the information holder 10 includes various types of parameter information for detecting such access areas (continuous areas) that prevents a further seek operation to an access to the media section 14 or that minimizes its generation frequency, the usage status of the continuous areas, and faulty block information.

Figure 4:
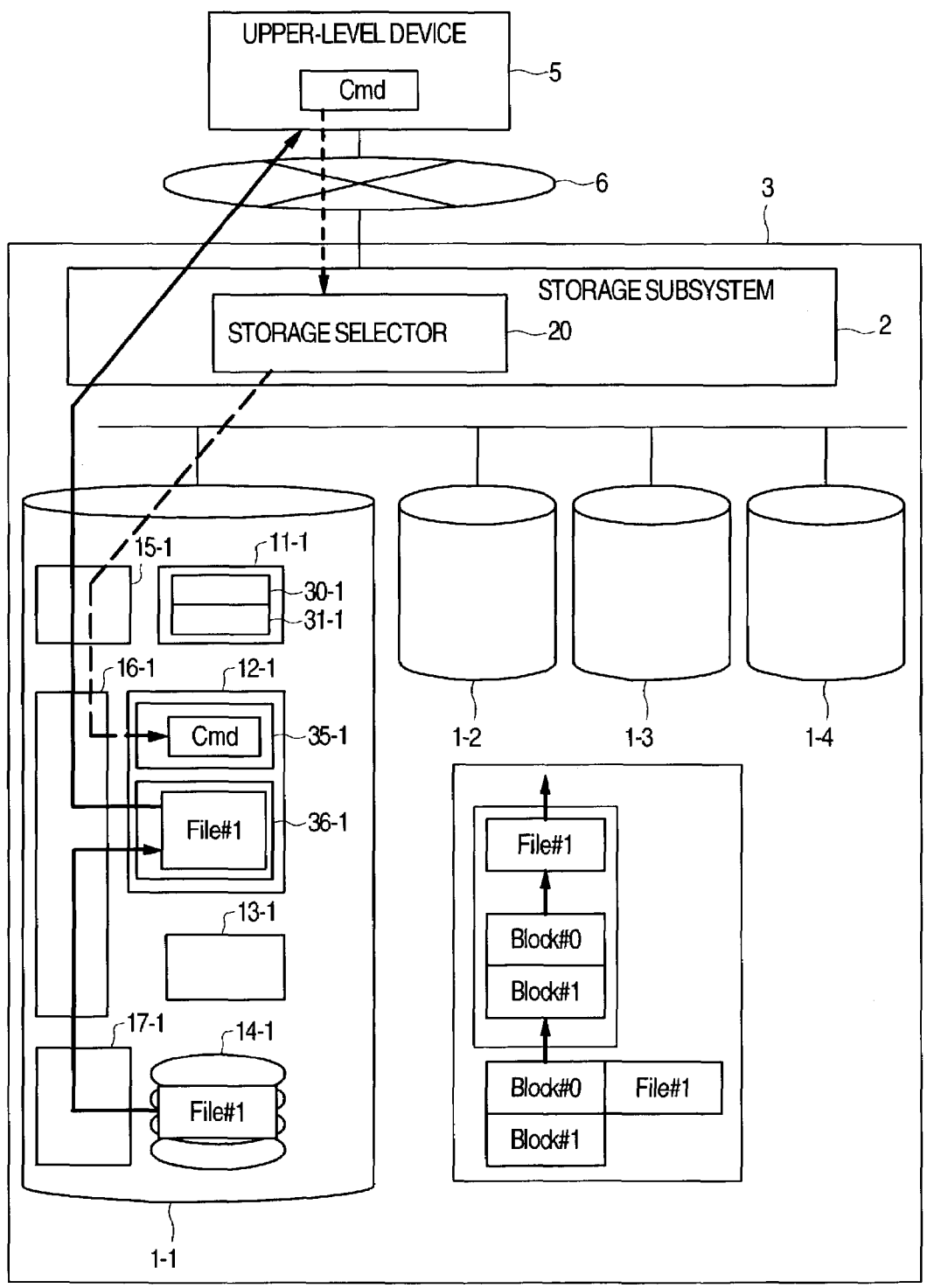
FIG. 4 shows a structure of subsystem management information in the first embodiment and how to set it as an example.
Figure 5:
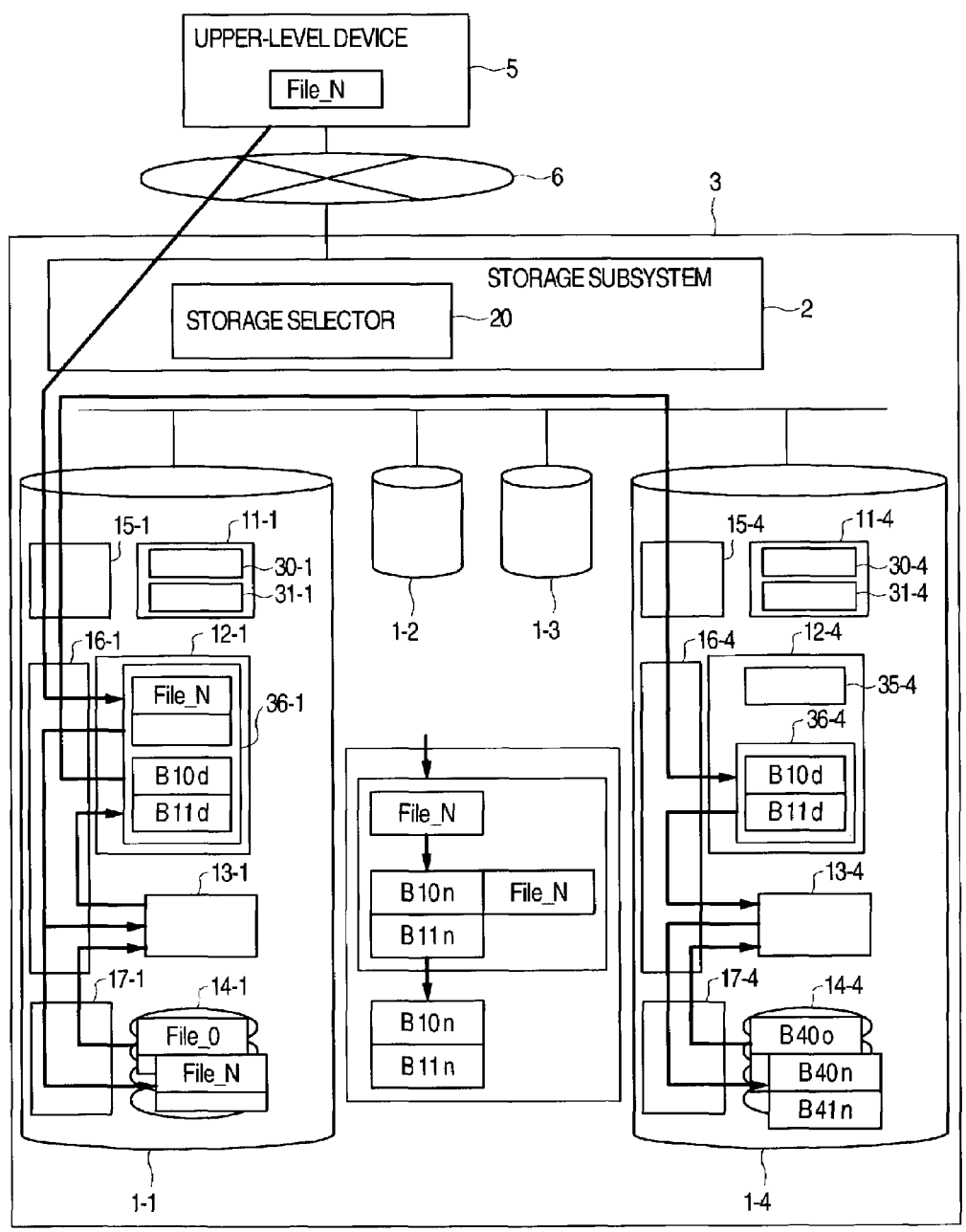
FIG. 5 shows an example of reading operation on a file basis in the first embodiment.
Figure 6:
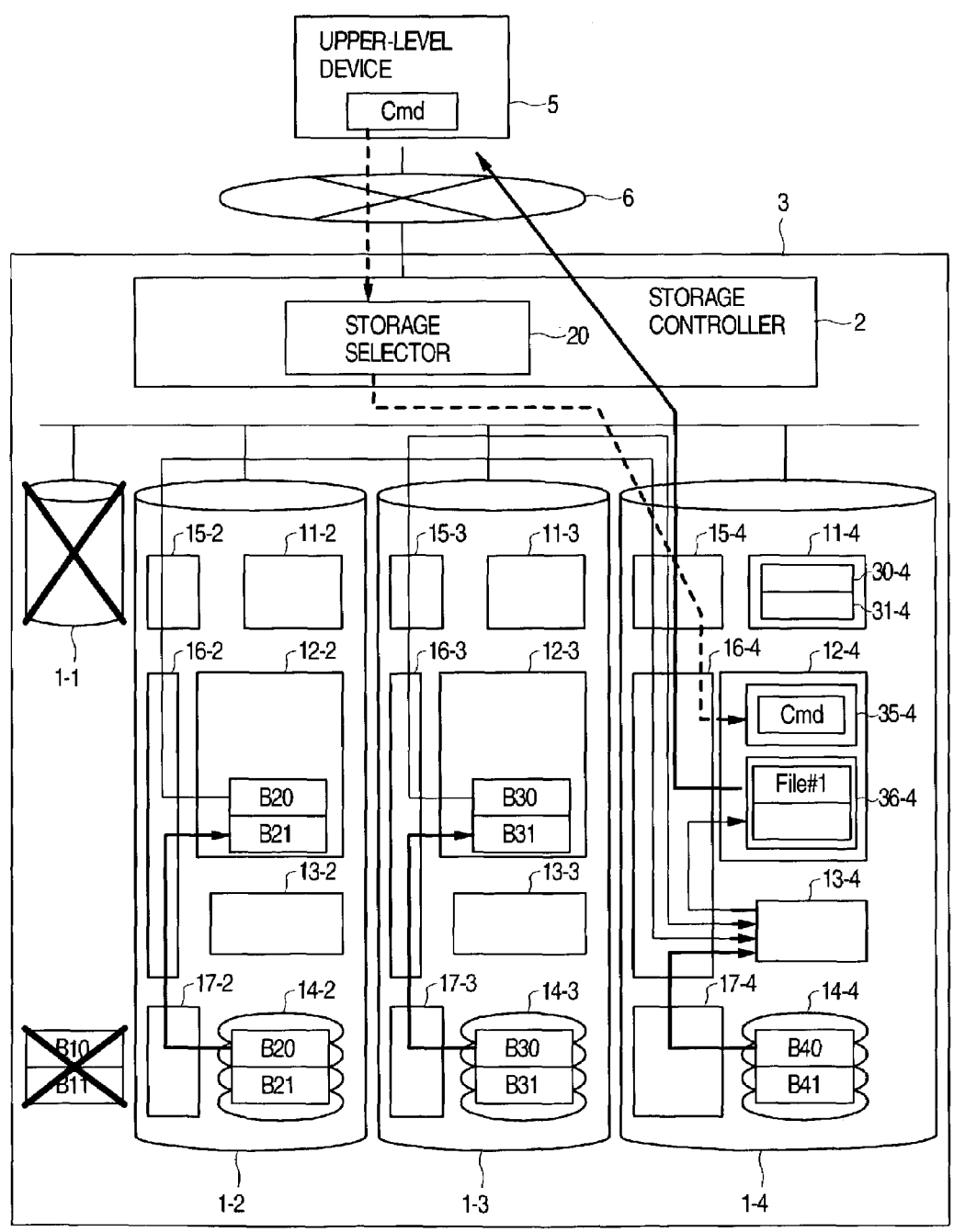
FIG. 6 shows an example of writing operation on a file basis in the first embodiment.
Figure 7:
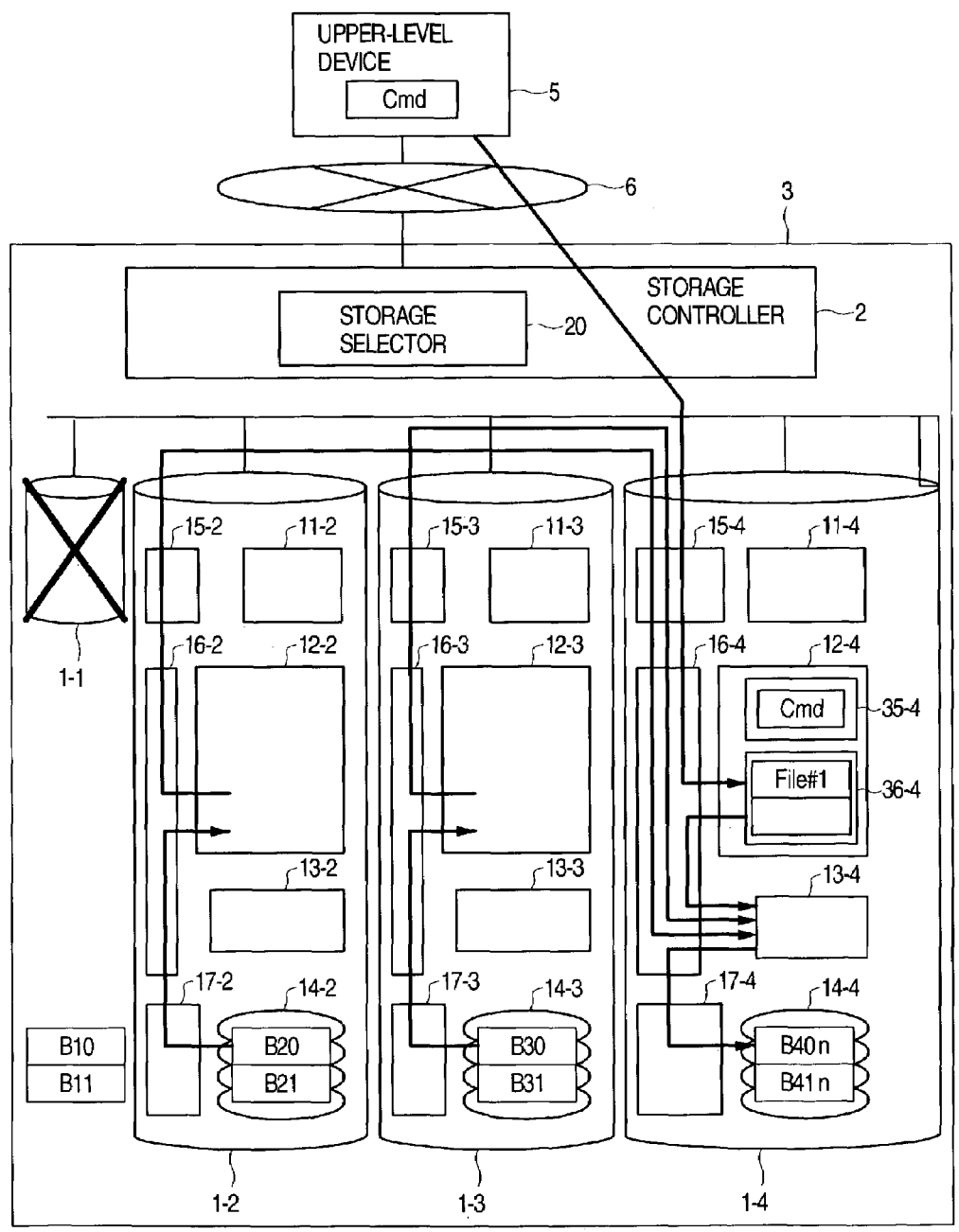
FIG. 7 shows an example of reading operation (degraded mode) of a file unit in the first embodiment.

Explanation will be made as to how storage systems 1-1 to 1-4 cooperatively operate to process a Cmd. It is assumed in the first embodiment that the storage system 1-1 is one to be accessed. In FIGS. 4 and 6, flows of the Cmd are denoted by dotted lines and flows of user data are denoted by solid lines. In FIGS. 5 and 7, flows of the Cmd are omitted.

(1) Read Request Processing on File Basis

FIG. 4 shows an example of the operation when a read request of a file unit (referred to as the read request, hereinafter) is issued from the upper-level device 5 to the storage subsystem 3. In the subsequent drawings, parts seemingly unnecessary to explain are omitted.

The storage controller 2 first receives the Cmd via the network 6.

The storage controller 2 detects in the storage selector 20 on the basis of the various types of information of the received Cmd and the storage system selection management information the fact that the Cmd is a read request to a file to be stored in the storage system 1-1, and transmits the Cmd to the storage system 1-1. In this conjunction, various types of information include information for judgment of whether the Cmd is a read request or a write request or information for file identification. The storage system 1-1 transmits the received Cmd to a command storage area 35-1 of the buffer 12-1 via an interface control 15-1 and a buffer control 16-1 and stores it therein. Next, a command processing control 30-1 of the main controller 11, on the basis of various sorts of information in the Cmd and the file management information of the information holder 10, knows that the access type is a read request and detects the address of the leading block stored in the main controller 11 to be accessed and the block number continuous to the leading block. The word "access type" as used herein means information indicative of whether the Cmd is a read request, a new write (referred to as create, hereinafter) or update request.

The command processing control 30-1 starts to read out data of a block unit (referred to as the block data, hereinafter) which was detected as to be accessed from a media section 14-1 via a media control 17-1 and which includes data (referred to as the file data, hereinafter) accessed on a block basis, to a send/receive data storage area 36-1 of the buffer 12-1.

The command processing control 30-1 then converts the read-out data of a block unit on the basis of the size of the byte unit of the file management information. Thereafter, the command processing control 30-1 transmits the data of a file unit to the upper-level device 5 via the interface control 15-1.

(2) Write Request Processing on File Basis

FIG. 5 shows an example of the operation when a write request of a file unit was issued from the upper-level device 5 to the storage subsystem 3. Flows of the Cmd are similar to those in the above Item (1) and thus omitted in FIG. 5. It is also assumed that the write request includes both of create and update requests.

As in the above Item (1), the storage controller 2 detects that the Cmd is a write request, and determines whether the write request is an update request to the file already stored by the storage subsystem or a request for writing a new file. When the Cmd is an update write request, the storage controller 2 refers to linkage information between the file of the storage system selection management information and the storage systems, selects the storage system to which the update write request is to be transmitted, and transmits the update write request thereto. Assuming in this case that the storage system 1-1 already stores the file, then the storage controller 2 transmits the Cmd to the storage system 1-1. The storage controller, when determining that the Cmd is a create write request (a request of writing a new file), refers to idle information in the respective storage systems in the storage selection management information, determines one of the storage systems to which the access request is to be transmitted, and transmits the Cmd to the determined storage system. It is herein assumed that the storage system 1-1 is determined to be suitable to store the created file and the Cmd is transmitted to the storage system 1-1.

The command processing control 30-1 of the storage system 1-1, when receiving the Cmd of a write request, determines whether the Cmd is a create request or an update request depending on whether or not the identifier information of the file forming the Cmd is already registered in the file management information stored in its own information holder 10. And the command processing control 30-1 passes the control to a storage block control 31-1.

The storage block control 31-1 detects the address of the leading block to be accessed and to be optimumly stored in the media section 14 and the number of blocks continuous to the leading block, registers (or updates) these information as the media storage positions of the file management information, and registers (or updates) the usage status of the continuous areas of the media management information.

The command processing control 30-1 further creates new block data converted into an arbitrary number of blocks from the received file data of a byte unit. The command processing control 30-1 also reads out block data to be accessed into an update information generator 13-1. Next, the update information generator 13-1 generates data (referred to as the difference block data, hereinafter) corresponding to a difference between the new block data and block data to be accessed, based on a logical exclusive "OR" operation or the like, and issues a redundant data update request to the storage system 1-4 where the redundant data is to be stored. Next, the update information generator 13-1 issues an update request of the file management information relating to the file data, and further stores the new block data in a media section 11-1 via the media control 14-1.

Meanwhile, the storage system 1-4 receives the redundant data update request from the storage system 1-1 via an interface control 15-4 and a buffer control 16-4 and stores it in a command storage area 35-4. On the basis of various sorts of information forming the received redundant data update request, the storage system 1-4 then detects in a command processing control 30-4 the address of the leading block of a media section 14-4 to be accessed and the number of blocks continuous to the leading block.

The command processing control 30-4 starts reading the access-objective block (old redundant block data) detected from the media section 14-4 via a media control 17-4 into a send/receive data storage area 36-4.

The update information generator 13-4 generates new redundant block data from the difference block data received from the storage system 1-1 and the old redundant block data, stores the new redundant block data in the media section 14-4 via the media control 17-4, and updates the file management information associated with the updating operation of the redundant block data.

(3) Rearrangement of Fragmented Block Data

When data update request was issued from the upper-level device 5 to the storage subsystem 3, there sometimes occurs such a situation that, due to file data increase or the like, continuous areas cannot be reserved in the media section 14 to the continuous blocks to be accessed and the block data forming an identical file can be fragmented (becomes discontinuous). Explanation will be made as to how to rearrange such block data in the above case.

In the storage system 1 to be subjected to date storage, the storage block control 31 detects the block data stored in discontinuous areas with use of the media storage positions of the file management information.

Using the size of the file management information, the media storage position, the usage status of the continuous areas of the media management information, etc.; the storage block control detects the address of the access-objective leading block optimum to be newly stored in the media section 14 and the number of blocks continuous to the leading block, updates these information as the media storage positions of the file management information, and also updates the usage status of the continuous areas of the media management information.

From the block data to be rearranged and the block data of its rearrangement destination, the command processing control 30 generates update information based on a logical exclusive "OR" operation or the like in the update information generator 13, and issues a redundant data update request to the storage system to be subjected to storage of the redundant data. And the command processing control 30 stores the block data to be rearranged in the media section 14 via the media control 17.

The operation of the storage system 1 for storing the redundant data is similar to that in the above Item (2).

There are other optimum rearrangement methods, that is, a method for designating file storage areas based on generation of a difference in access speed between the storage areas, and a method for rearranging a file accessed as associated therewith closer thereto to reduce generation frequencies of seeking operation wait and disk rotation wait.

When the access history of the file management information is used, the rearrangement of a file having a higher access frequency in a higher-access-speed area in the storage block control 31 of the storage system 1 can realize high speed when viewed from the upper-level device. Further, when the priority order and media management information are also used, the rearrangement of a file having a higher priority order in a higher-access-speed area or the rearrangement of files having an identical priority in closer areas can realize high speed when viewed from the upper-level device.

In this connection, through the rearranging operation of the fragmented block data, the rearrangement of file data already stored can also be carried out using areas of the media section 14 not used.

From the updating operation of the file management information, the block data to be rearranged, and the block data at the rearrangement destination; the storage system for rearranging the file data already stored creates difference block data based on the logical exclusive "OR" operation or the like, stores the block data to be rearranged in the media section, and transmits the difference block data to the storage system where the redundant data is already stored.

Even in the storage system having the redundant data already stored, by performing a similar operation to the aforementioned redundant block data updating operation, the storage system can realize rearranging operation of the already stored file data.

In this connection, idle (not used) areas are generated not only by the rearranging operation of file data but also by the deleting operation of file data, upon which the already-stored file data can also be rearranged.

(4) Read Request Operation (Degradation) on File Basis

In the above Items (1) to (3), explanation has been made in connection with the case where the storage system 1 is normal. Explanation will next be made in connection with a processing case where any of the storage systems 1-1 to 1-3 became faulty (degraded) as an example.

FIG. 6 shows an exemplary operation when a read request of a file unit was issued from the upper-level device 5 to the storage subsystem 3. In the Items (4) and (5), it is assumed that the storage system 1-1 became faulty.

As in the above case, the storage controller 2 detects that the Cmd is a read request to a file to be stored in the storage system 1-1. The storage controller also detects that the storage system 1-1 is faulty using the storage selector management information and transmits the Cmd to the storage system 1-4 having the redundant data stored therein.

The storage system 1-4 in turn receives the Cmd from the storage controller 2, and the command processing control 30-4 in the storage system judges that the access type is a read request to the storage system 1-1 and detects the address of the leading block to be accessed and the number of blocks continuous to the leading block.

The command processing control 30-4, on the basis of the detected information, starts reading out redundant block data corresponding to the block data to be accessed into the buffer control 16-4. And the command processing control 30-4 issues a read request of the block data to the storage systems 1-2 and 1-3 having the block data corresponding to the block data to be accessed already stored therein.

The storage systems 1-2 and 1-3, when receiving the read request from the storage system 1-4, transmit block data based on the read request to the storage system 1-4.

In the storage system 1-4, further, the update information generator 13-4 in the storage system restores the block data of the storage system 1-1 from the block data and redundant block data received from the storage systems 1-2 and 1-3, and converts the restored block data into a file unit on the basis of the byte unit size of the file management information. And the update information generator 13-4 executes transmitting operation to the upper-level device 5.

(5) Write Request Operation (Degradation) on File Basis

FIG. 7 shows an exemplary processing operation when a write request of a file unit was issued from the upper-level device 5 to the storage subsystem 3.

As in the Items (2) and (4), the command processing control 30-4 of the storage system 1-4 judges that the access type of the Cmd is a write request to the storage system 1-1, and issues a read request of block data to the storage systems 1-2 and 1-3. And the storage systems 1-2 and 1-3 transmits the block data based on the read request to the storage system 1-4.

Next, the storage system 1-4 receives the block data from the storage systems 1-2 and 1-3 and the file data of a byte unit from the upper-level device 5. The update information generator 13-4 in the storage system 1-4 generates new redundant block data on the basis of the received block data and file data and new block data converted by the command processing control 30-4 into an arbitrary number of blocks, stores (updates) the new redundant block data in the media section 14-4 under control of the media control 17-4, and updates the file management information associated with the updating operation of the redundant block data.

Through the operations of the Items (1) to (5), the storage subsystem including a plurality of storage systems and holding redundant data can realize a control scheme where the Cmd is processed by the plurality of storage systems and the simple storage controller.

In addition, there can be realized a storage subsystem including a plurality of storage systems wherein the performance of each storage system can be effectively used by optimumly controlling file storage areas or wherein the performance can be improved by reducing the load of the storage controller.

[Second Embodiment]
(Storage System Eliminating Storage Controller)

Explanation will be made in connection with a second embodiment of the present invention by referring to FIG. 8.

Figure 8:
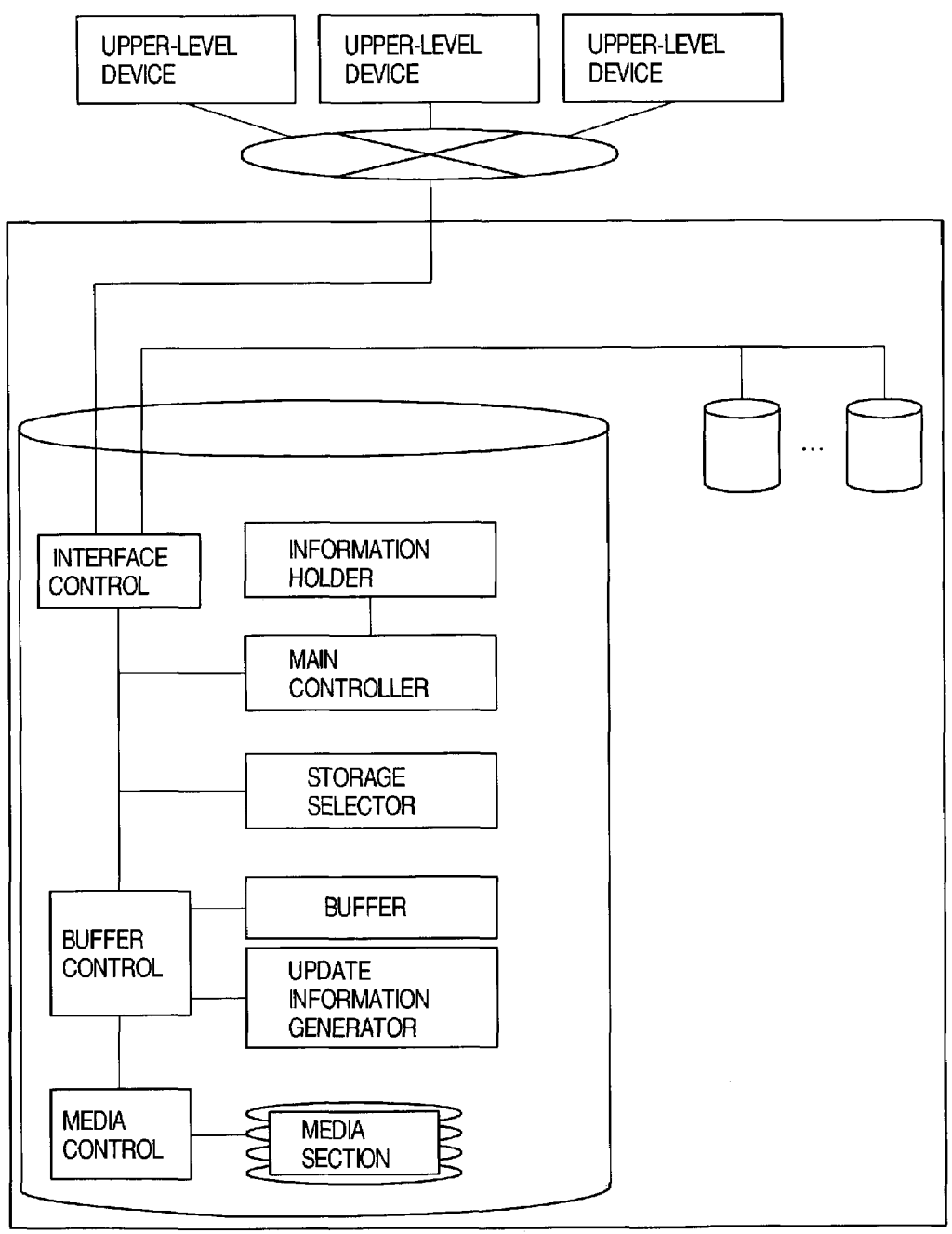
FIG. 8 shows an example of writing operation (degraded mode) of a file unit in the first embodiment.

FIG. 8 shows an example of an information processing system which includes a storage subsystem 3 having a plurality of storage systems 1 and also includes a plurality of upper-level devices 5.

FIG. 8 is different from FIG. 1 in that the storage subsystem 3 only a plurality of storage systems 1-1 to 1-N, that only the storage system 1-1 is connected to the upper-level devices 5 via a network 6, that an interface control 15 controls communication with the upper-level devices 5 based on a predetermined protocol, that a storage selector 20 is provided within the storage system 1-1, and that an information holder holds storage selector management information.

In accordance with the present embodiment, there can be implemented a storage subsystem of a control scheme wherein an access request of a file unit from an upper-level device can be processed only a plurality of storage systems included therein, that is, which can eliminate the need for provision of a storage controller.

Although the network 6 and an intra-subsystem network 4 are depicted as independent of each other, they may be connected to each other via a common network. For example, the networks are connected with each other by a loop connection such as FC-AL so that the upper-level devices are connected to the storage systems in an identical loop.

In this case, the storage system, wherein a flag was set to the entry of the storage system subsystem ID in the subsystem management information of FIG. 3, may execute the aforementioned storage selecting operation. The storage selecting operation or the operation of detecting a faulty storage system may be carried out by a single storage system, or may be carried out by a plurality of storage systems for the purpose of lightening the load involved by the storage selecting operation.

As an exemplary processing, there is a scheme wherein an access request of a file unit from the upper-level device 5 is broadcast to all the storage systems of the storage subsystem 3, which is called the broadcast scheme.

Each of the storage systems when receiving the broadcast access request, on the basis of the storage selector management information, judges whether or not the access request is to be processed by its own.

In this case, since each storage system is only required to judge whether or not to process the access request by its own, the load can be lightened when compared to the load of the storage controller performing all the storage selecting operations And similarly to the first embodiment, the storage system, on the basis of the result of the judging operation, executes subsequent operations.

In this connection, the plurality of storage systems are all not required to have the same type. For example, since it is anticipated that access is focused on the storage system for storage of the redundant data, it is also possible for the storage system to have a higher access speed.

in accordance with the present embodiment, there can be realized a storage subsystem which can eliminate the need for provision of a storage controller, a problem with a connection distance between the storage controller and storage systems in the prior art storage subsystem can be eliminated, the flexibility in the arrangement of the storage systems can be increased, and the data safety to a calamity such as earthquake can be improved by placing the respective storage systems having a redundant arrangement at locations sufficiently away.

[Third Embodiment]
(RAID5, without Parity Spanning)

Explanation has been made in connection with the case where the storage system for storage of the redundant data is fixed in the first and second embodiments, but the present invention is not limited to the specific example.

Explanation will be made as a third embodiment of the present invention in connection with a case where the storage system for storage of the redundant data is not fixed, that is, an exemplary operation when RAID5 is applied.

Since the storage selecting operation in the second embodiment is executed in the respective storage systems and the RAID5 is applied in the present embodiment, it is assumed that the upper-level devices and the respective storage systems are connected to each other by a common network.

Newly provided in the present embodiment are means for using a Cmd commonly, various types of information forming the Cmd, means for discriminating between the need or no need of processing by its own on the basis of the file management information or subsystem management information, and means for executing transferring operation of block data between the storage systems when it is necessary to perform the operation cooperatively with use of the plurality of storage systems.

The file management information is arranged to hold one media storage position for each file ID. That is, in FIG. 2, only one media storage position is illustrated.

Explanation will be made as to data transferring operation with use of FIGS. 9 to 11.

Figure 9:
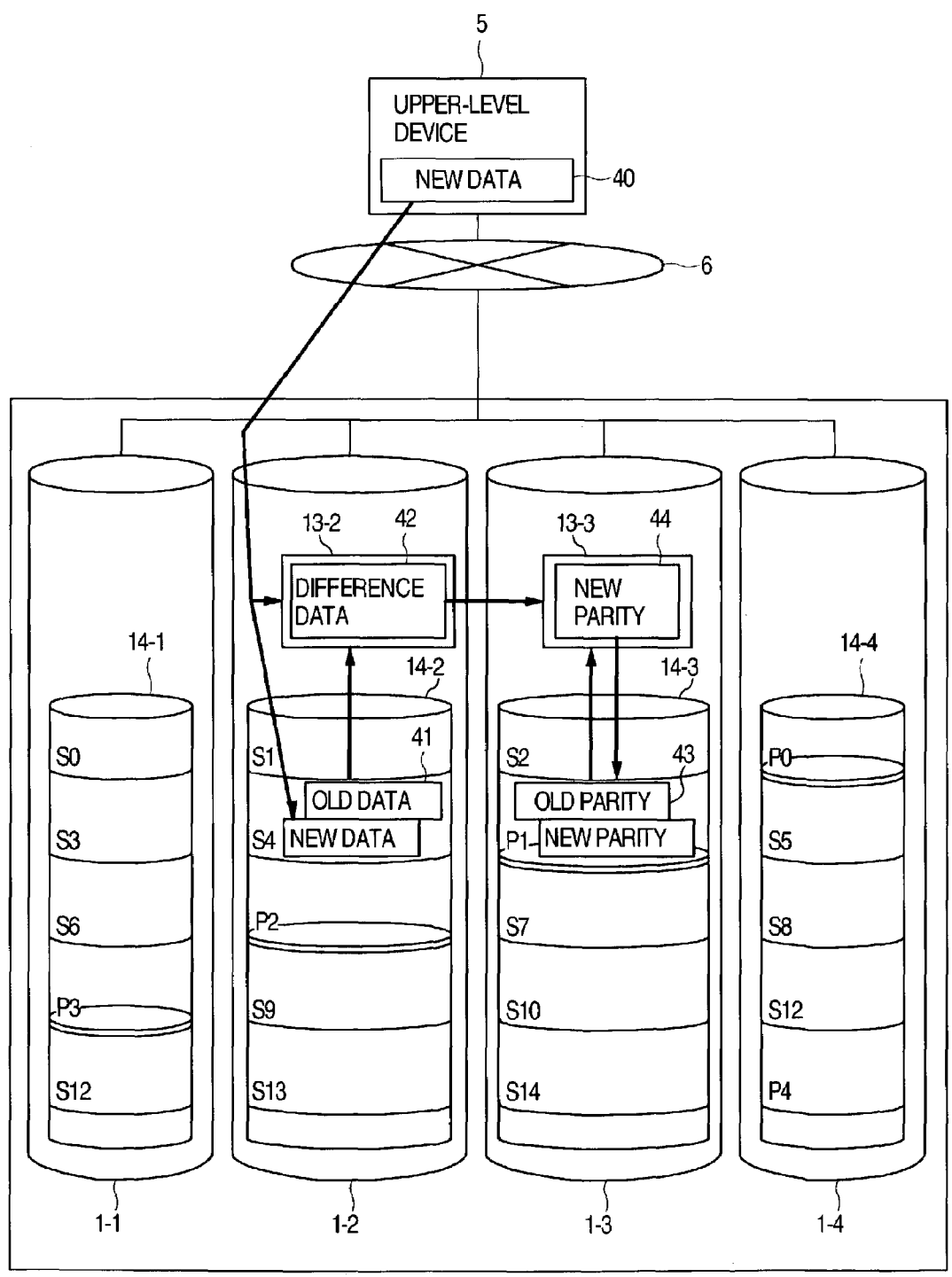
FIG. 9 shows an example of writing operation (degraded mode) of a file unit in a third embodiment.

FIG. 9 shows an operation when a write request of a file unit was issued from the upper-level device 5 to the storage subsystem 3 as well as an example of parity data updating operation.

The storage systems forming the storage subsystem have a structure similar to those in FIG. 8, but unnecessary parts in the following description are omitted. The media section 14 is logically divided into data stripes (S0 to S14 in the drawing) and parity stripes (P0 to P4 in the drawing) for storage of parity data for management. For example, the data stripes S3 to S5 and the parity stripe P1 form a parity group.

The transferring operation of the Cmd is omitted in FIG. 9, but the storage systems 1-1 to 1-4 receives the Cmd and judge that the storage system 1-2 is to be subjected to updating operation of file data and the storage system 1-3 is subjected to updating operation of the parity data.

Details of the Cmd and command processings (including judging operation of need or no need of operation by its own and the transferring operation of the block data between the storage systems when the operation cooperated by the plurality of storage systems is necessary) will be explained later.

In the storage system 1-2, an update information generator 13-3 transmits to the storage system 1-3 to be subjected to the parity data updating at least difference data 42 created from file data (new data in the drawing) 40 received from the upper-level device 5 and from data (old data in the drawing)

41 associated with the new data and already stored in its own, and stores (updates) the new data in a media section 14-2 (S4) in its own.

Meanwhile, the storage system 1-3 creates new parity data (new parity in the drawing) 44 on the basis of the difference data 42 received from the storage system 1-2 and the parity data (old parity in the drawing) 43 already stored in its own, and stores it in its own media section 14-3 (P1).

In the above explanation, it is also possible to execute the parity data updating operation on a stripe basis.

Figure 10:
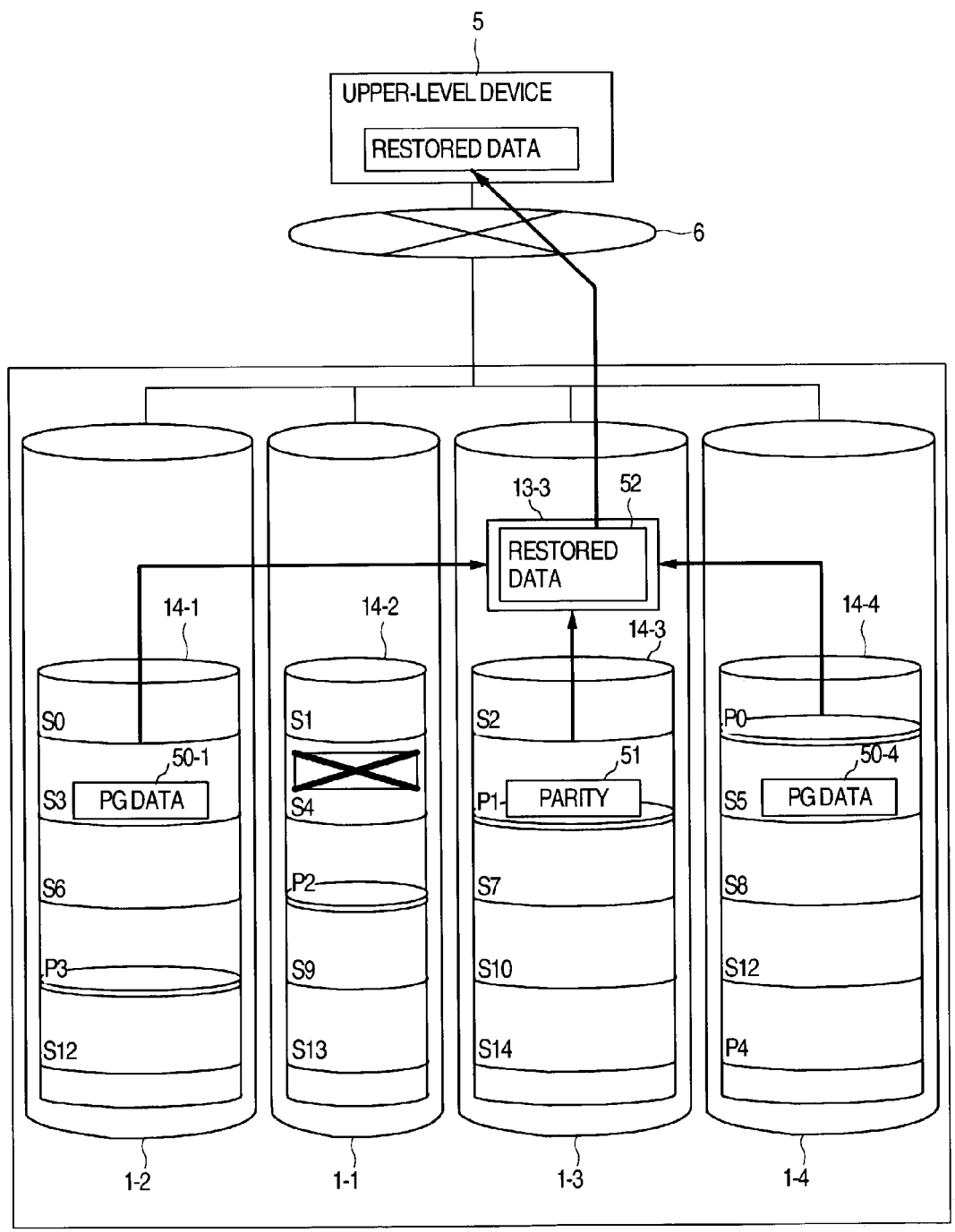
FIG. 10 shows an example of reading operation (degraded mode) of a file unit in the third embodiment.

FIG. 10 shows an example of operation based on the parity data when a read request of a file unit to file data stored in the storage system 1-2 when becoming faulty was issued.

The storage systems 1-1 to 1-4 forming a parity group transmit to the storage system 1-3 parity group data (PG data in the drawing) 50-1 and 50-4 corresponding to the file data to be subjected to the access request.

The storage system 1-3, on the basis of the parity group data 50-1 and 50-4 and parity data (parity in the drawing) 51 stored in its own, restores file data (restored data in the drawing) to be subjected to access request, and transmits it to the upper-level device 5.

Figure 11:
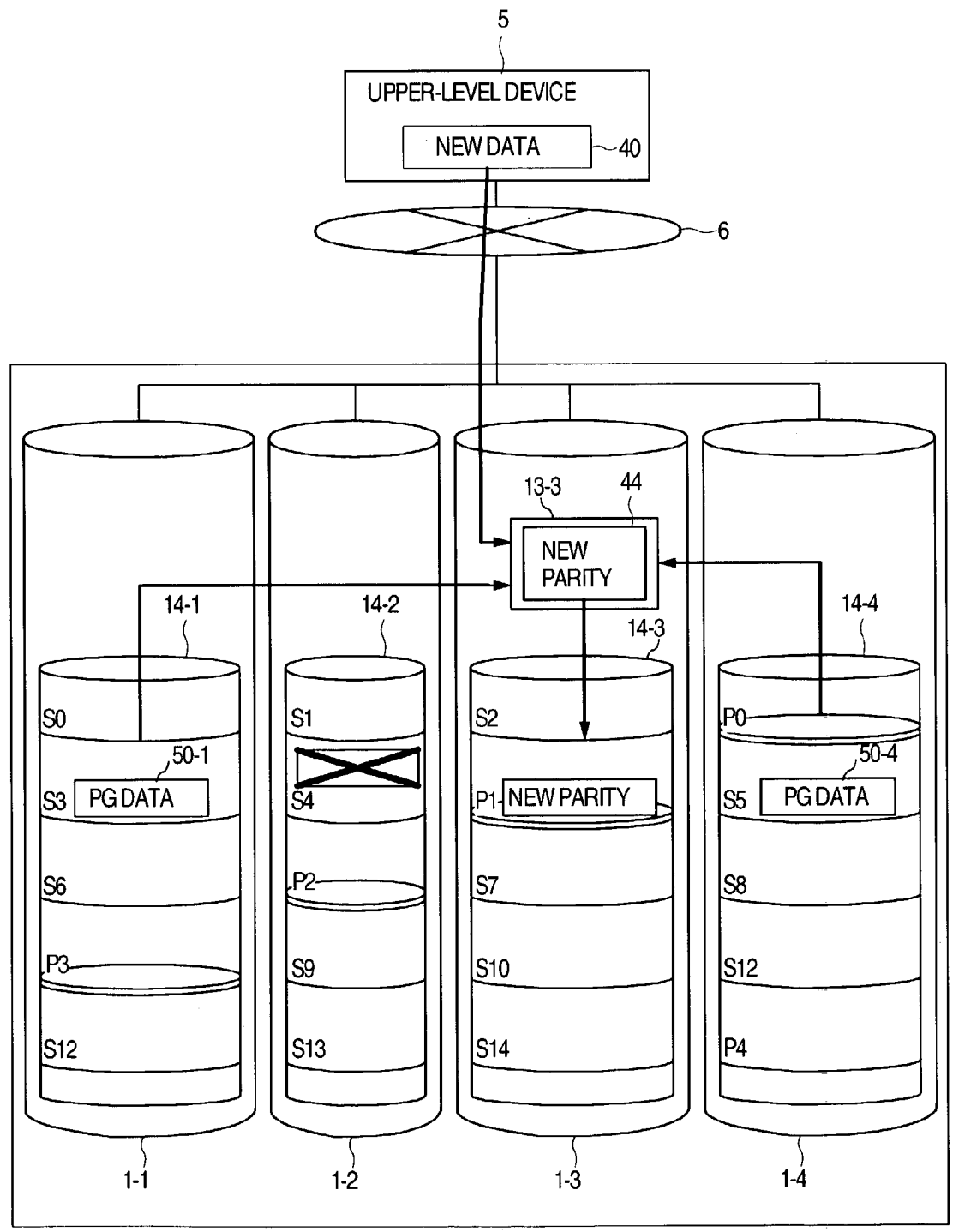
FIG. 11 shows an example of writing operation (degraded mode) of a file unit in the third embodiment.

FIG. 11 shows an example of parity data updating operation when a write request of a file unit to the file data stored in the faulty storage system 1-2 was issued.

The storage systems 1-1 and 1-4 forming the parity group transmit to the storage system 1-3 the parity group data (PG data in the drawing) 50-1 and 50-4 corresponding to the file data to be access request.

Meanwhile, the storage system 1-3 creates new parity data (new parity in the drawing) 44 on the basis of the file data 40 received from the upper-level device 5 and the parity group data 50-1 and 50-4 received from the storage systems 1-1 and 1-4, and stores (updates) it in its own media section 14-3 (P1).

Explanation will then be made as to the command processing operation.

The storage system (1) receives a Cmd from the upper-level device, (2) interprets the Cmd, (3) executes the operation based on the Cmd and the file management information or subsystem management information, (4) deletes the Cmd, thus completing its series of operations.

(1) Reading Command Processing Example

Figure 12:
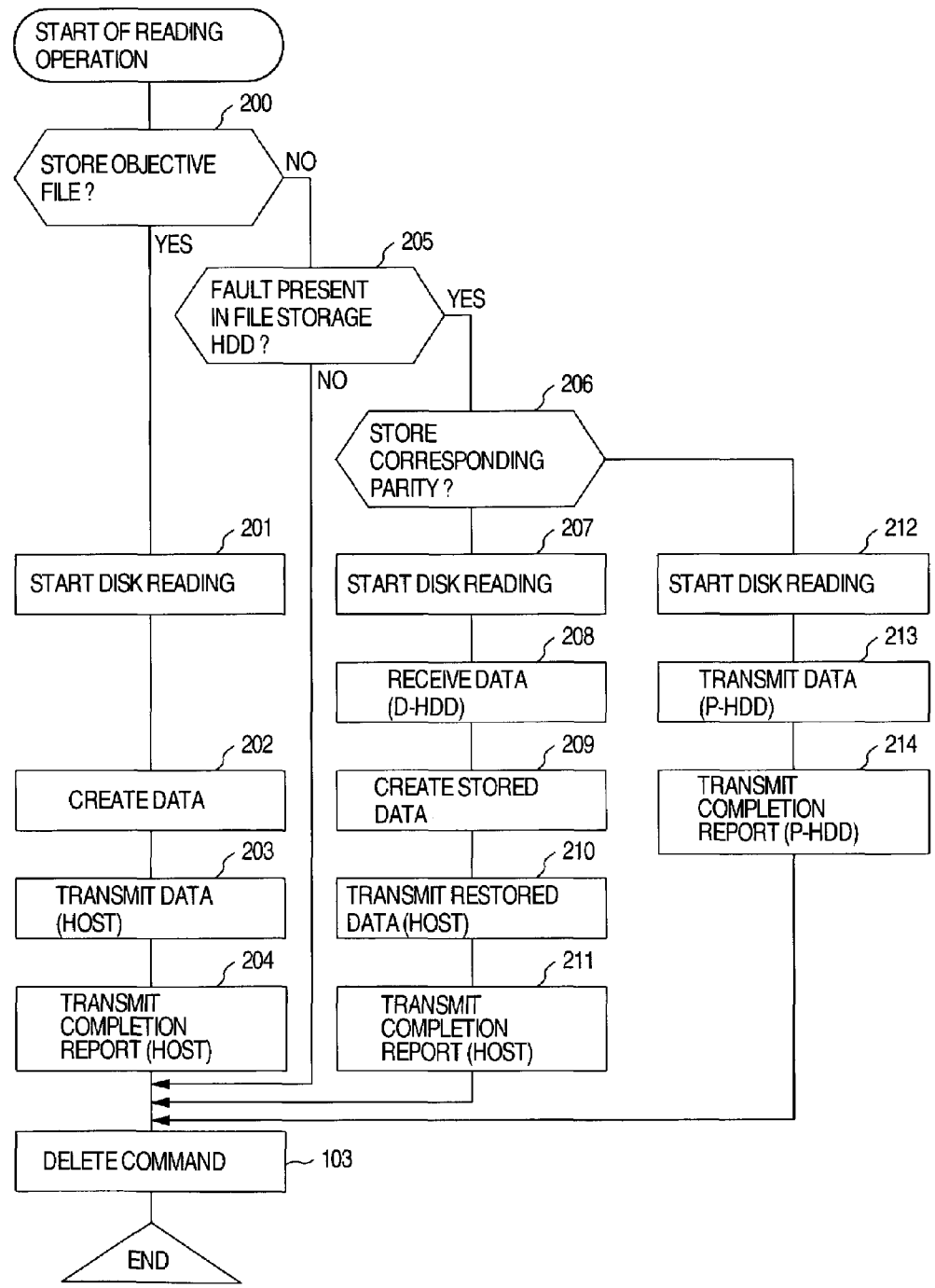
FIG. 12 shows an example of reading command operation in the third embodiment.

FIG. 12 shows an exemplary processing example when the Cmd is a reading command.

The storage system, when receiving the Cmd, judges on the basis of the result of the Item (2) whether or not to store a file associated with the Cmd in its own (step 200).

The storage system having the file associated with the Cmd stored in its own starts its disk reading operation from the media section 14 on the basis of information on the Cmd (step 201). In this case, the word "disk reading operation" as used herein means to read out the data of the media section 14 into the send/receive data storage area 36 of the buffer 12. Next, the storage system creates file data through operations similar to those in the foregoing embodiment (step 202), transmits the created file data and a completion report to the upper-level device (steps 203 and 204), deletes the Cmd (step 103), thus completing its series of operations.

Meanwhile, the storage system having the file associated with the Cmd not stored in its own detects the presence or absence of a fault in the storage system having the file associated with the Cmd stored therein on the basis of information on the Cmd, file management information or subsystem management information (step 205).

In the absence of a fault (when the storage system is normal), the storage system deletes the Cmd (step 103), thus completing its series of operations.

In the presence of a fault (when the storage system is degraded), the storage system judges whether or not to store the parity data corresponding to the file of the Cmd in its own (step 206).

When the storage system determines to store the parity data in its own, the storage system starts the disk reading operation for the parity data from the media section 14 on the basis of the Cmd information (step 207). Furthers, the storage system waits for reception of parity group data from another storage system forming the parity group (step 208), creates restored data from the parity data and parity group data (step 209), transmits the restored data and a completion report to the upper-level device (steps 203 and 204), and then deletes the Cmd (step 103), thus completing its series of operations.

Meanwhile, if the storage system fails to store the parity data in its own, then for the purpose of transmit the parity group data stored in its own to the storage system having the parity data stored therein, the storage system starts the disk reading operation on the basis of the Cmd information and the like (step 212), transmits the read-out parity group data and a completion report to the storage system having the parity data stored therein (steps 213 and 214), deletes the Cmd (step 103), thus completing its series of operations.

(2) Writing Command Processing Example

Figure 13:
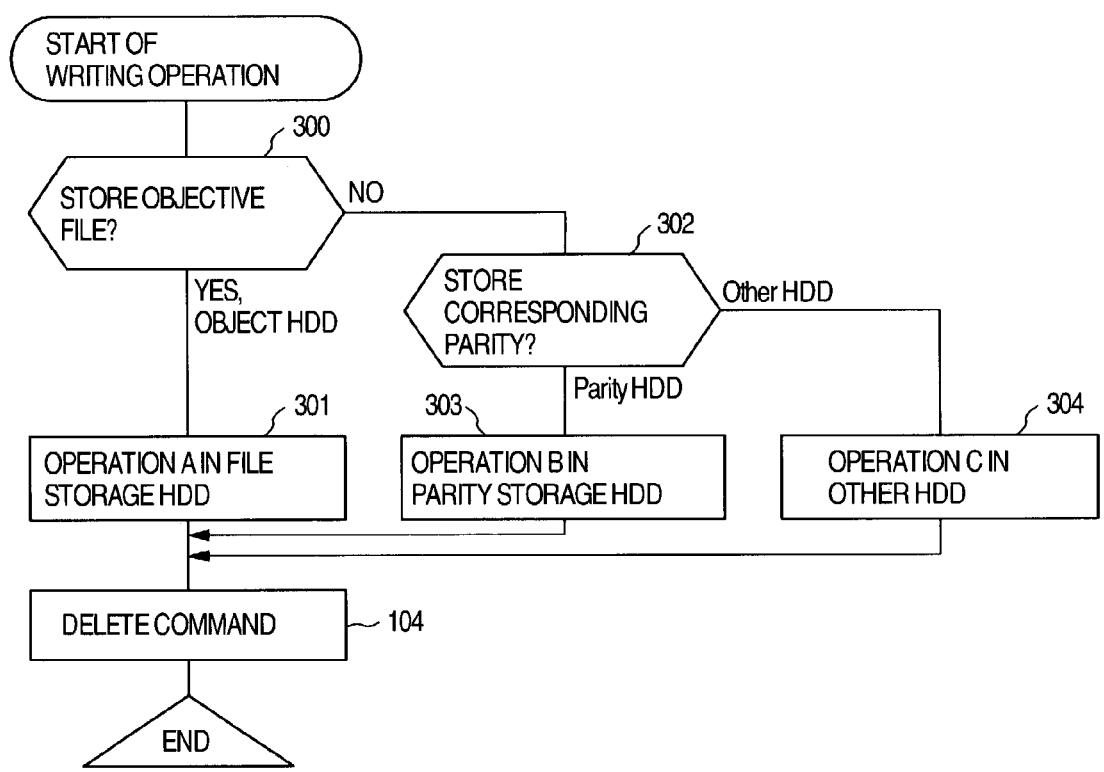
FIG. 13 shows an example of writing command operation (summary) in the third embodiment.

FIG. 13 shows a processing example when the Cmd is a writing command.

The storage system, when receiving the Cmd, judges whether or not to store the file of the Cmd in its own on the basis of the result of the Item (2) (step 300).

An operation A (step 301) when the storage system stores the file to be subjected to the access request therein will be explained later.

When the storage system judges not to store the file therein, the storage system judges whether or not to store the parity data corresponding to the file of the Cmd therein (step 302). An operation B (step 303) when the storage system stores the parity data therein as well as an operation C (step 304) when the storage system does not store the parity data therein will also be explained later. After the operations A, B and C, the storage system deletes the Cmd (step 103), thus completing its series of operations.

Explanation will be made as to the operations A, B and C.

(2-a) Operation A in Storage System Having File Stored Therein

Figure 14:
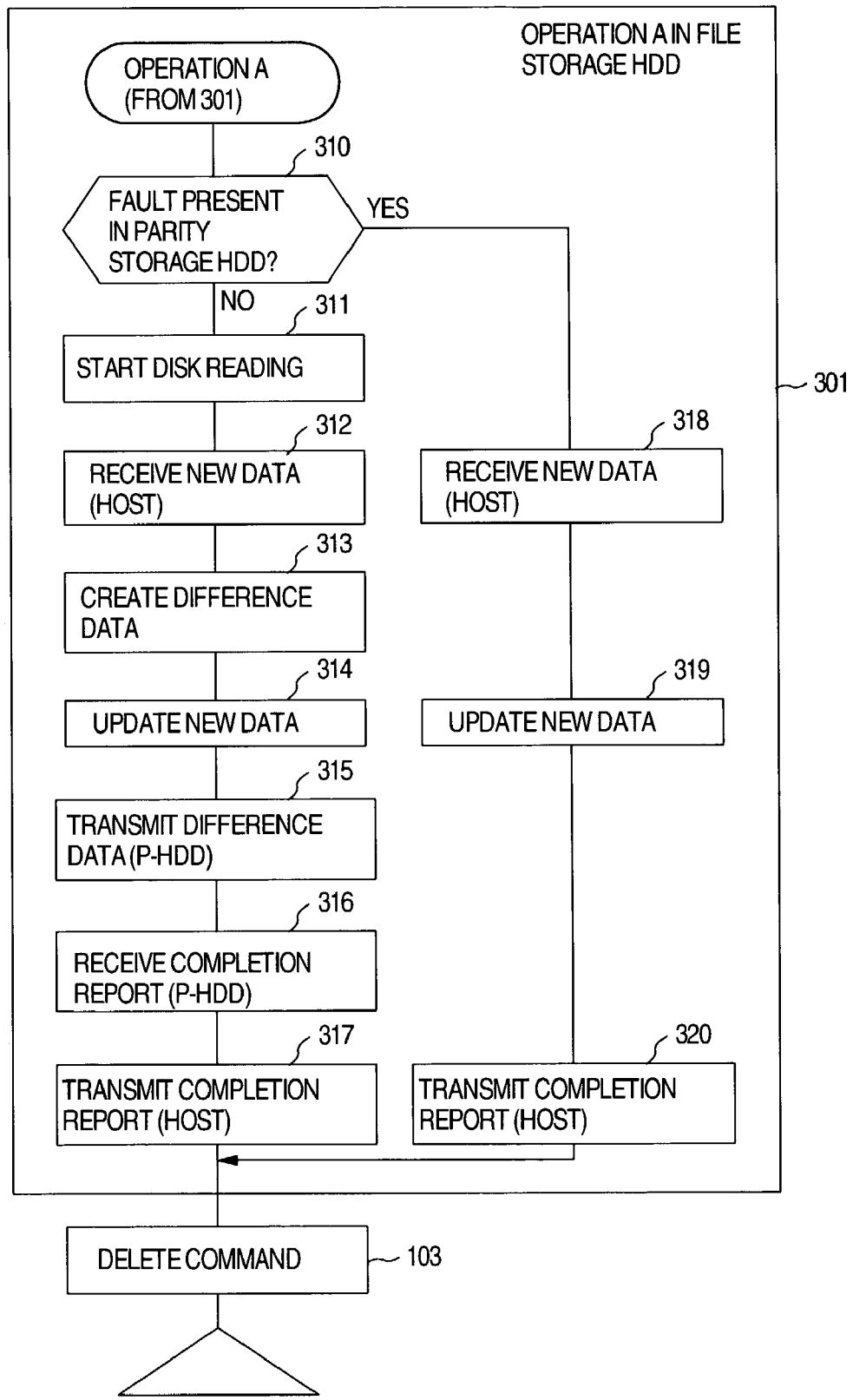
FIG. 14 shows an example of writing command operation in the third embodiment.

FIG. 14 shows a writing processing example in the storage system having the file of the Cmd stored therein.

The storage system detects the presence or absence of a fault in a storage system having the parity data corresponding to the file of the Cmd stored therein (step 310). On the basis of the detection, the storage system judges the need or no need of the parity data updating operation.

In the absence of a fault in the storage system having the corresponding parity data stored therein, the storage system starts the disk reading operation on the basis of the Cmd information, etc. (step 311). The storage system then waits for reception of new data (step 312), and creates difference data from the new data and data based on the disk reading operation (step 313). The storage system further stores the new data in the media section 14 (step 314), transmits the difference data created in the step 313 and a completion report to the storage system having the parity stored therein (steps 316 and 317), deletes the Cmd (step 103), thus completing its series of operations.

When there is a fault in the storage system having the corresponding parity data stored therein, on the other hand, the storage system waits for reception of new data from the upper-level device (step 318), stores the new data in the media section 14 on the basis of the Cmd information, etc. (step 319), transmits a completion report to the upper-level device (step 320), deletes the Cmd (step 103), thus completing its series of operations.

(2-b) Operation B in Storage System Having Parity Data Stored Therein

Figure 15:
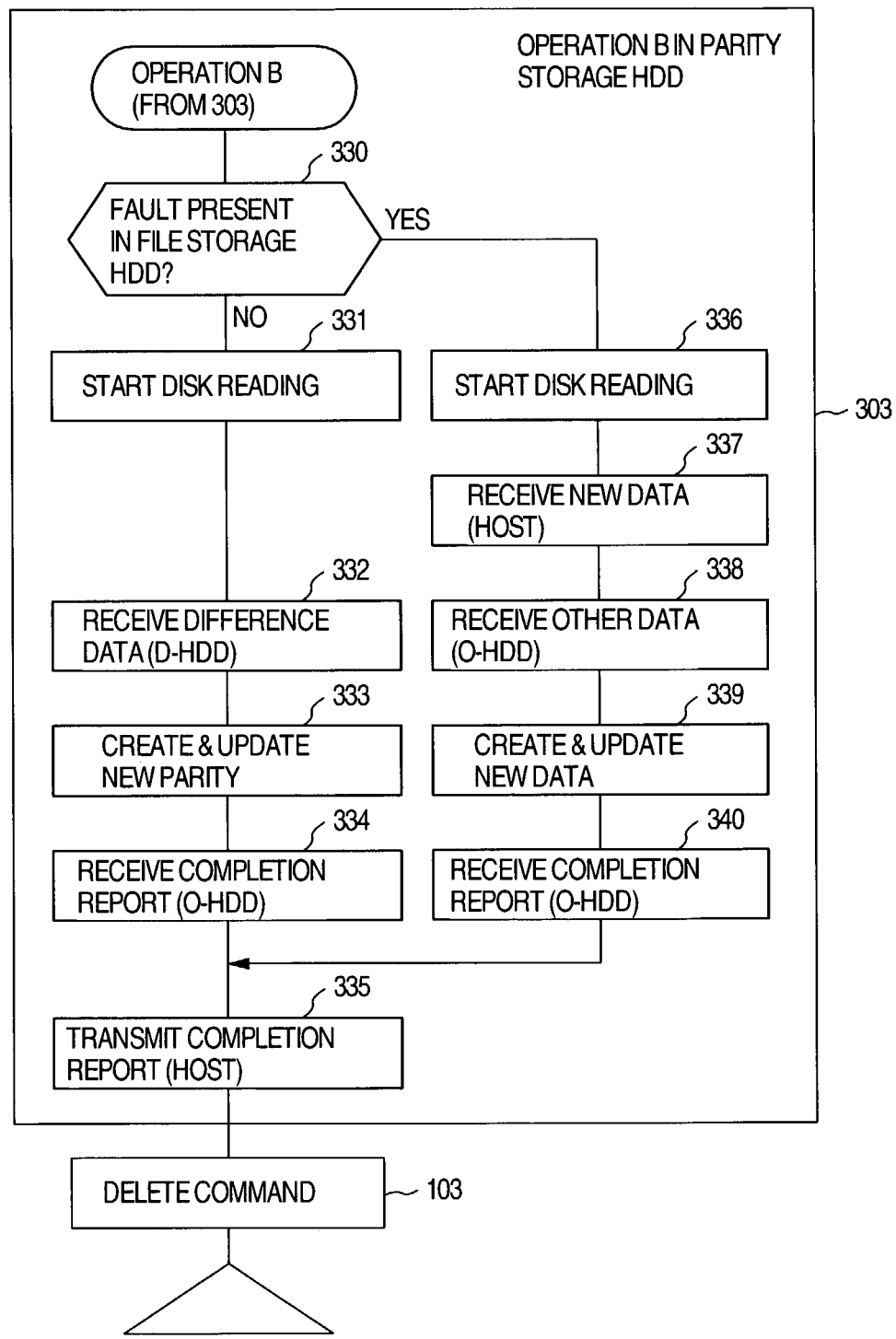
FIG. 15 shows an example of writing command operation in the third embodiment.

FIG. 15 shows a writing processing example in the storage system having the parity data corresponding to the file of the Cmd.

The storage system detects the presence or absence of a fault in the storage system the file of the Cmd stored therein (step 330).

In the absence of a fault in the storage system having the file of the Cmd stored therein, the storage system starts the disk reading operation of the old parity data from the media section 14 on the basis of the Cmd information, etc. (step 331). The storage system further waits for reception of the difference data from the storage system having the file of the Cmd stored therein (step 332), creates new parity data from the old parity data and difference data, and executes its updating operation (step 333). The storage system furthermore transmits the completion report (step 334) received from the storage system having the file of the Cmd stored therein and a completion report based on its own processed result to the upper-level device (step 335)s, deletes the Cmd (step 103), thus completing its series of operations.

When there is a fault in the storage system having the file of the Cmd stored therein, on the other hand, the storage system starts the disk reading operation of the old parity data from the media section 14 on the basis of the Cmd information, etc. (step 336). The storage system further waits for reception (step 337) of new data from the upper-level device and reception (step 338) of parity group data from the storage system forming the parity group, creates new parity data from the new data and parity group data, and executes its updating operation (step 339). The storage system furthermore transmits the completion report received from the storage system forming the parity group (step 340) and a completion report based on its own processed result to the upper-level device (step 335), deletes the Cmd (step 103), thus completing its series of operations.

(2-c) Operation C in Other Storage System

Figure 16:
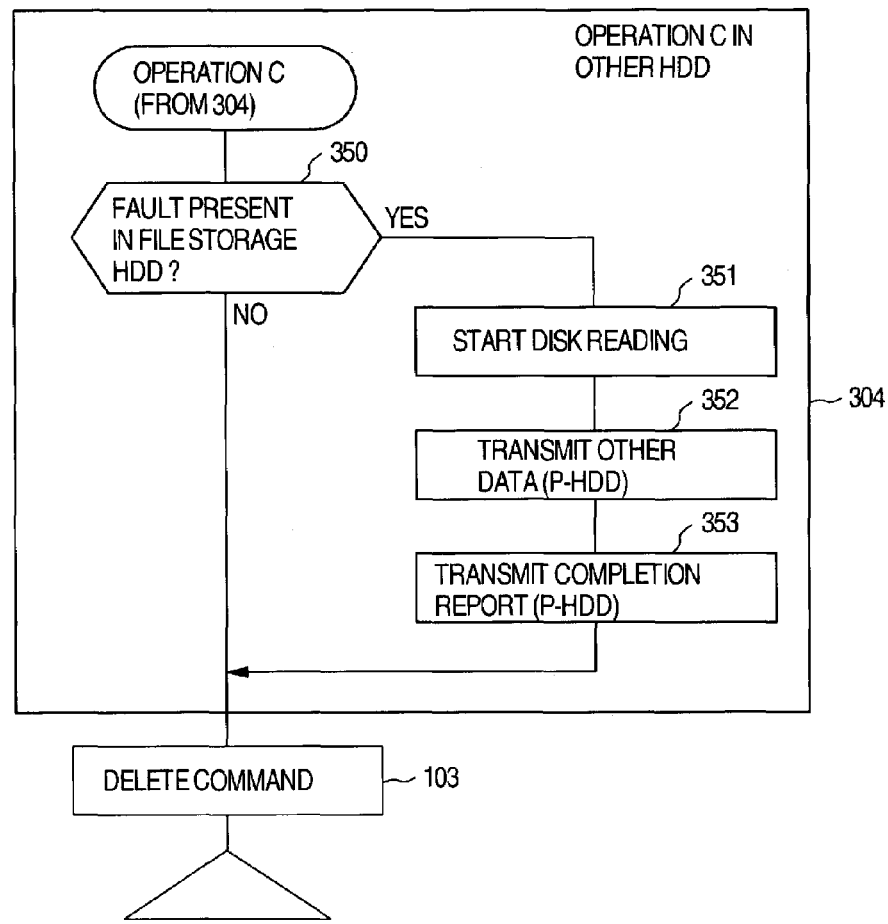
FIG. 16 shows an example of writing command operation in the third embodiment.

FIG. 16 shows a writing processing example in the storage system having the file of the Cmd or the parity data corresponding to the file stored therein.

The storage system detects the presence or absence of a fault in the storage system having the file of the Cmd stored therein (step 350).

In the absence of a fault in the storage system having the file of the Cmd stored therein, the storage system deletes the Cmd (step 103), thus completing its series of operations.

When there is a fault in the storage system having the file of the Cmd stored therein, on the other hand, the storage system starts the disk reading operation of the parity group from the media section 14 on the basis of the Cmd information, etc. (step 351), and transmits the parity group data to the storage system having the parity data stored therein (step 352). Further, after transmitting a completion report to the storage system having the parity data stored therein (step 353), the storage system deletes the Cmd (step 103, thus completing its series of operations.

When the respective storage systems forming the storage subsystem 3 execute the above command operations, the storage selecting operation, which has been carried out by the storage controller 2 or by at least one storage system 1 in the foregoing embodiment, can be executed by the respective storage systems. Further, the operation of not fixing (RAID5) the storage system for storage of the redundant data can be realized.

[Fourth Embodiment] (RAID5, Without Parity Spanning, Master Control Type)

In the foregoing embodiment, each of the storage systems forming the storage subsystem judges the need or no need of the command operation in its own. However, in order to realize this, it is necessary for each storage system to hold the file management information with respect all the files stored in the storage subsystem, and it is also necessary to attach information such as a storage system ID for storage of the file as the media storage position forming the file management information. Thus explanation will be made as to an embodiment which is designed to reduce the amount of management information held by the respective storage system.

In the present embodiment, when parity control such as parity data updating is required, the storage system for storing the corresponding parity data executes the parity control. The then storage system is referred to as the master. As a result, since each of the storage systems forming the storage subsystem holds the file data stored in its own and the file management information relating the parity data, operations similar to those in the foregoing can be realized.

Figure 17:
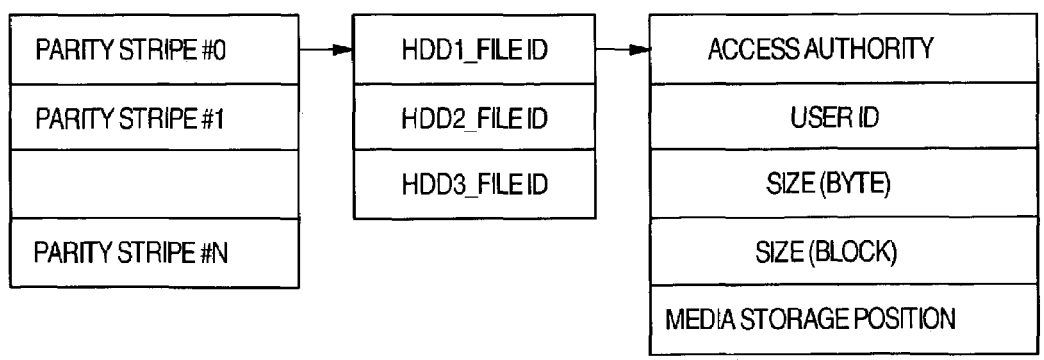
FIG. 17 shows an example of command operation (summary) in a fourth embodiment.

FIG. 17 shows an exemplary structure of the file management information relating to the parity data. The file management information includes a file ID corresponding to each of its own parity stripes. The file ID includes an access authority, a user ID, a size and media storage position.

Explanation will next be made as to the command operation.

The storage system interprets information on the Cmd as soon as receiving the Cmd. The storage system then judges whether or not to store the file data as the target of the Cmd or the parity data corresponding to the file data in its own on the basis of the interpreted result. When the command operation is required, the storage system executes the command operation according to the Cmd, deletes the Cmd, thus completing its series of operations. When the command operation is unnecessary, the storage system deletes the Cmd, thus completing its series of operations.

(1) Reading Command Processing Example

Figure 18:
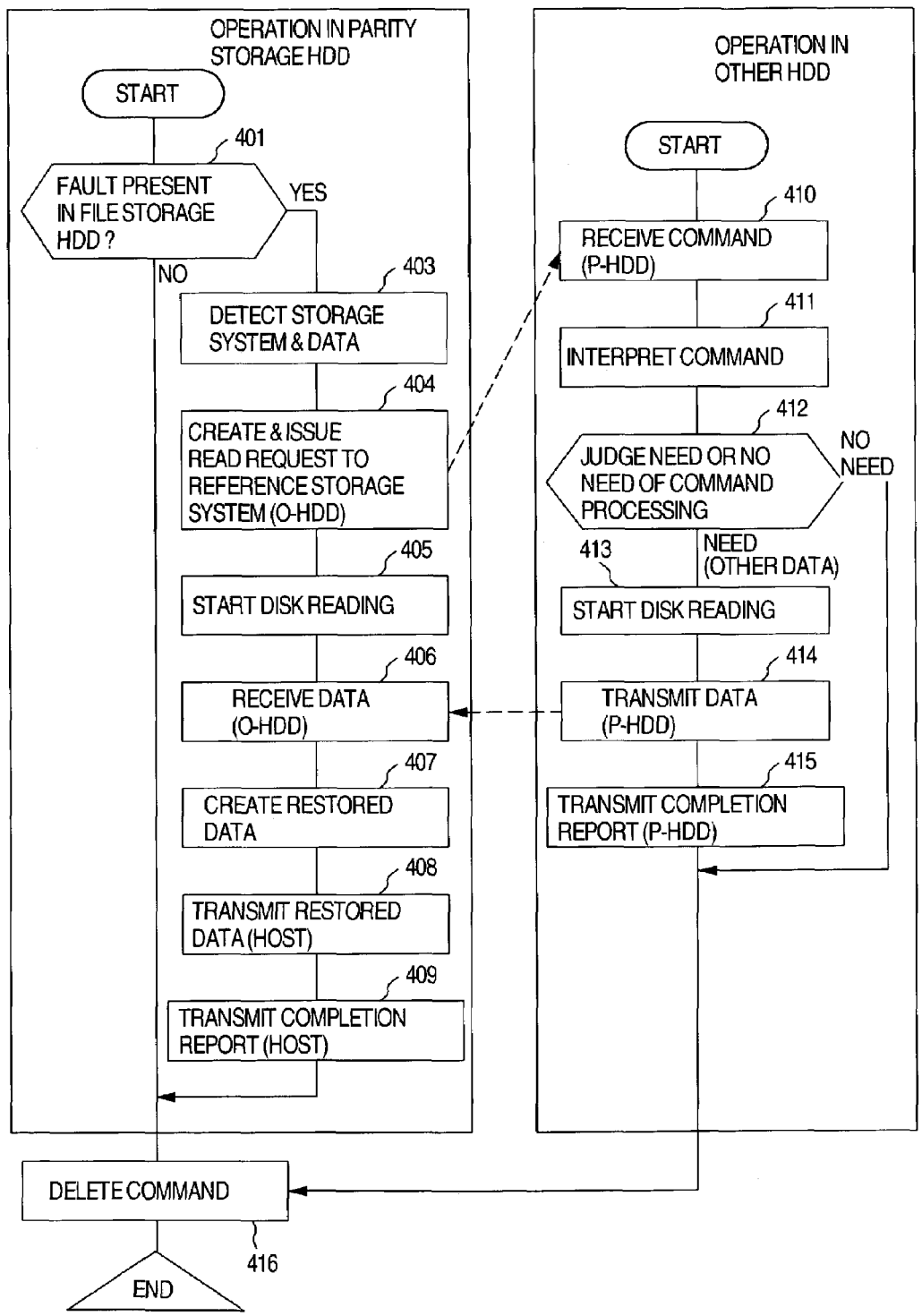
FIG. 18 shows an example of reading command operation in the fourth embodiment.

FIG. 18 shows an exemplary processing when the Cmd is a reading command.

In this connection, since the operation of the storage system having the file data stored therein is substantially the same as that in the foregoing case, explanation thereof is omitted. And only the storage system having the parity data stored therein and the command operation of the storage system forming the parity group are illustrated.

The storage system having the parity data stored therein detects the presence or absence of a fault in the storage system having the file data of the Cmd stored therein on the basis of the subsystem management information, etc. (step 401). In the absence of a fault, the storage system deletes the Cmd (step 416), thus completing its series of operations.

In the presence of a fault, the storage system detects the storage system forming the parity group as well as address information for storage of data about the parity group (step 403), creates and issues a read request to the storage system for storage of the parity group data (step 404).

Further, the storage system starts the disk reading operation of the parity data (step 405), and waits for reception of the parity group data from another of the storage systems forming the parity group (step 406). And the storage system creates date restored from the parity data and parity group data (step 407), transmits the created restored data and a completion report to the upper-level device (steps 408 and 409), deletes the Cmd (step 416), thus completing its series of operations.

The storage system further, when receiving the read request of the parity group data from the storage system having the parity data stored therein (step 410), interprets the Cmd information (command interpretation in the drawing) (step 411), and judges the need or no need of the command operation in its own on the basis of the command interpretation results (step 412). When judging the need of the command operation in its own, the storage system transmits the parity group data stored in its own to the storage system having the parity data stored therein. To this end, the storage system starts the disk reading operation on the basis of the Cmd information, etc. (step 413), transmits the read-out parity group data and completion report to the storage system having the parity data stored therein (steps 414 and 415), deletes the Cmd (step 416), thus completing its series of operations.

(2) Writing Command Processing Example

Figure 19:
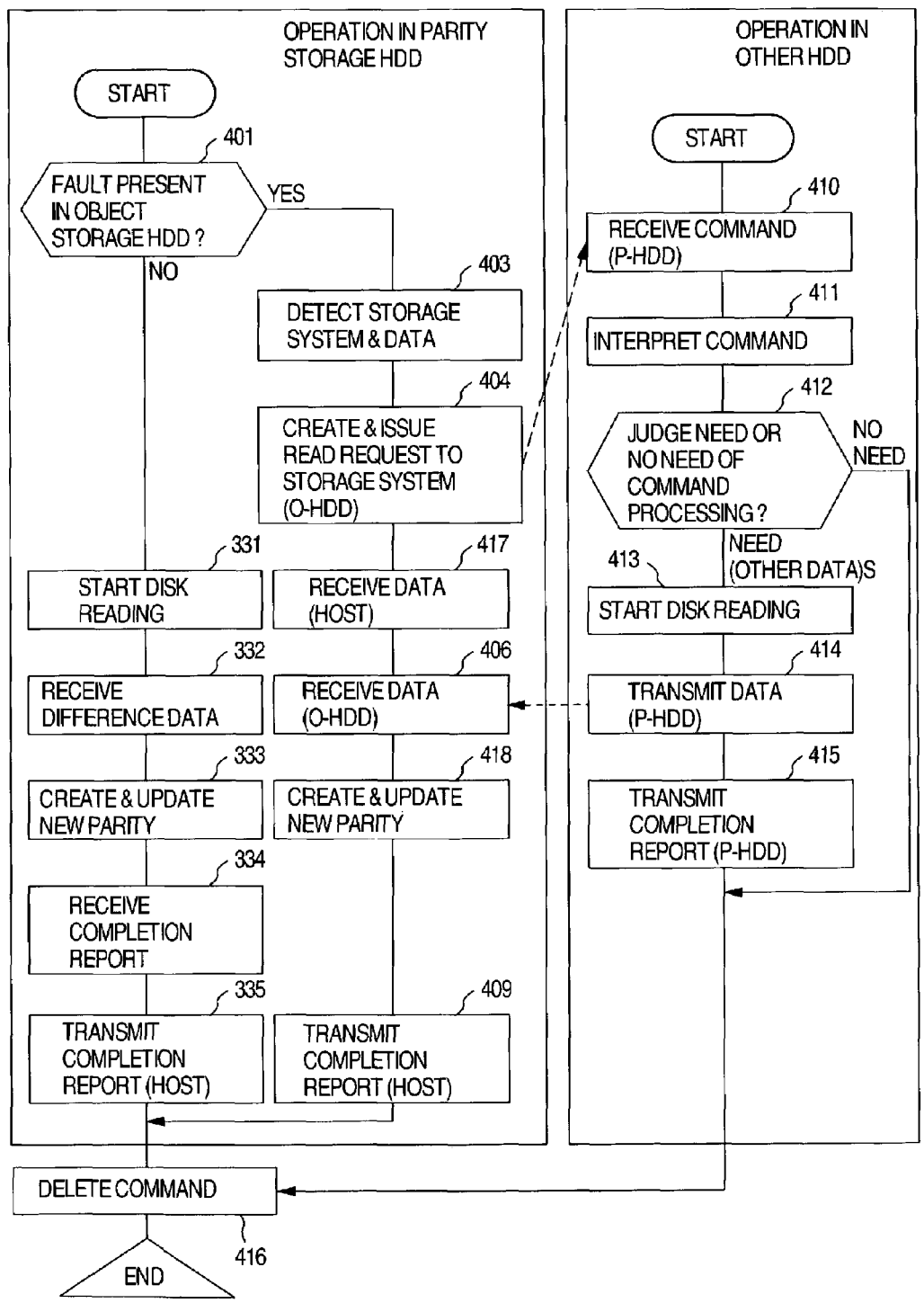
FIG. 19 shows an example of writing command operation in the fourth embodiment.

FIG. 19 shows a processing example when the Cmd is a writing command. In this case, the operation of the storage system having the file data stored therein is substantially the same as that in the foregoing case and thus explanation thereof is omitted. And only the storage system having the parity data stored therein and the command operation of the storage system forming the parity group are illustrated.

The storage system having the parity data stored therein detects the presence or absence of a fault in the storage system having the file data as the target of the Cmd stored therein on the basis of the subsystem management information, etc. (step 401).

In the absence of a fault, the storage system starts the disk reading operation of the old parity data (step 331), receives difference data (step 332), creates new parity data from the old parity data and difference data and updates (step 333), receives a completion report from the storage system having the file of the Cmd stored therein (step 334), transmits the completion report based on its own processed result to the upper-level device (step 335), deletes the Cmd (step 416), thus completing its series of operations.

In the presence of a fault, on the other hand, the storage system detects the storage system forming the parity group and address information for storage of the parity group data (step 403), creates and issues a read request to the storage system having the parity group data stored therein (step 404).

The storage system further waits for reception of the new data from the parity data and the parity group data from the other storage system forming the parity group (steps 417 and 406), creates new parity data from the new data and parity group data and updates (step 418), transmits a completion report to the upper-level device (step 409), deletes the Cmd (step 416), thus completing its series of operations.

The storage system, when receiving the read request of the parity group data from the storage system having the parity data stored therein (step 411), interprets the Cmd information (command interpretation in the drawing) (step 410), and judges the need or no need of the command operation in its own on the basis of the interpreted result (step 412).

When judging the need of the command operation in its own, the storage system transmits the parity group data stored in its own to the storage system having the parity data stored therein. To this end, the storage system starts the disk reading operation on the basis of the Cmd information, etc. (step 413), transmits the read-out parity group data and a completion report to the storage system having the parity data stored therein (steps 414 and 415), deletes the Cmd (step 416), thus completing its series of operations.

As mentioned above, the operation when the parity control such as the parity data updating is required can be realized. As a result, each of the storage systems forming the storage subsystem holds file data stored in its own and management information relating to the parity data, whereby the operation similar to the foregoing case can be realized, the amount of management information held by the storage system can be reduced, and the load involved by the judging operation of need or no need of the command operation to be executed by the storage system can be lightened.

[Fifth Embodiment]

(RAID5, with Parity Spanning Present)

Although explanation has been made in connection with the case where the file data as the target of the Cmd is stored in a single stripe in the foregoing embodiment, the present invention is not limited to the specific example.

Explanation will now be made as to an embodiment wherein the file data as the target of the Cmd is stored in a plurality of stripes, by referring to FIGS. 20 to 22.

First, an example of reading operation of a file unit is shown when a read request to the file data stored in a plurality of stripes was issued from the upper-level device 5 to the storage subsystem 3.

Each storage system, as in the foregoing embodiment, executes the command interpreting operation and the judging operation of need or no need of the command operation in its own on the basis of the Cmd information, file management information or subsystem management information.

When the storage system itself is the storage system having the file as the target of the Cmd stored therein, the storage system starts the disk reading operation on the basis of the Cmd information, creates file data through the operation similar to in the foregoing embodiment, transmits the created file data and a completion report to the upper-level device, deletes the Cmd, thus completing its series of operations.

In this case, the generation of the file data may be carried out by executing the disk reading operation on individual block data independently and combining the respective read-out data in a unit data. The disk reading operation can be executed through a single operation in a condition that the start block and the number of blocks to be read are specified. If the parity data is spanned by a plurality of data stripes, the generation of the file data may be executed by skipping the reading of the parity data.

Figure 20:
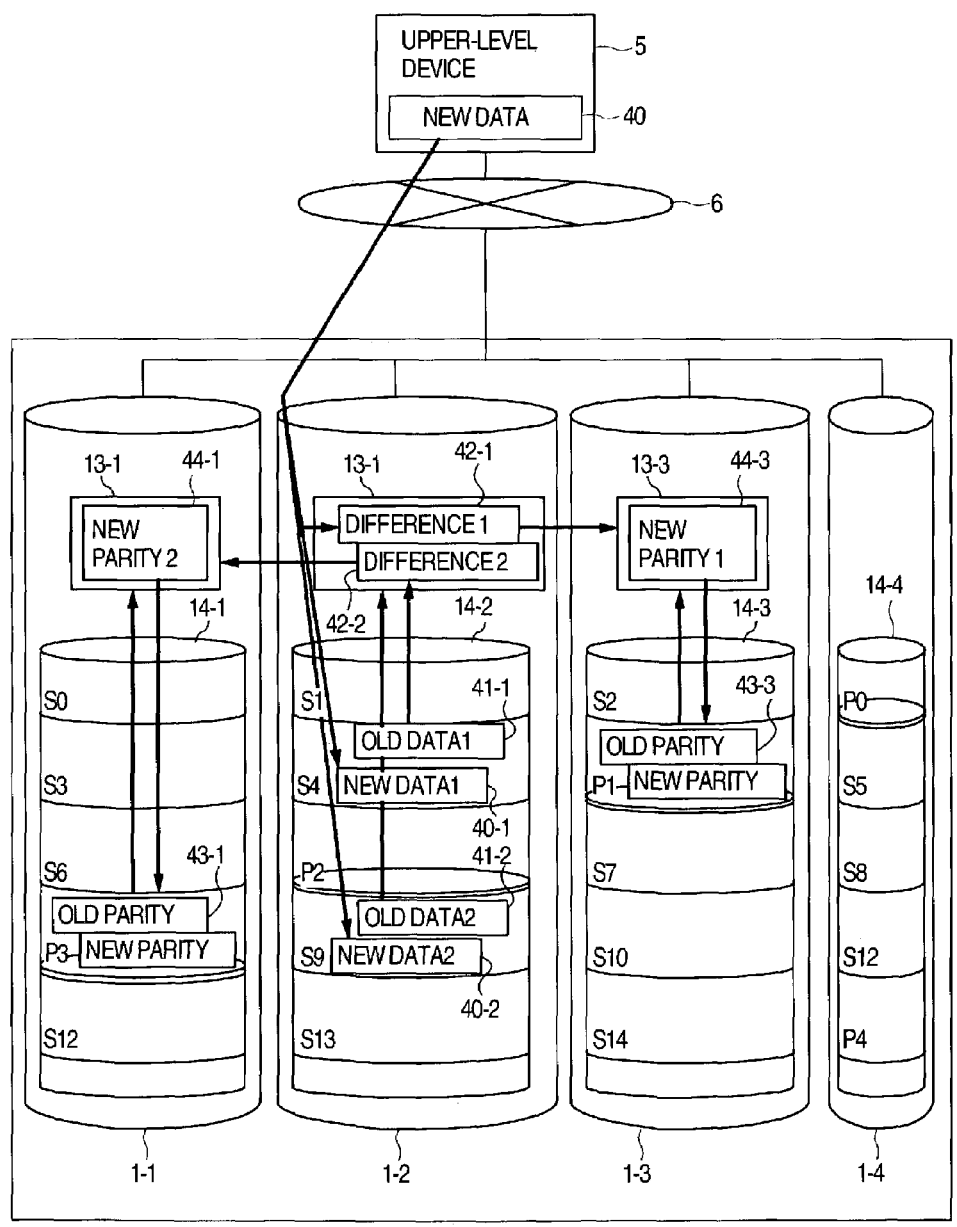
FIG. 20 shows an example of writing operation on a file basis in a fifth embodiment.

FIG. 20 shows an example of the writing operation of a file unit and parity updating operation when a write request to the file data stored in a plurality of stripes was issued from the upper-level device 5 to the storage subsystem 3. In FIGS. 20 to 22, it is assumed that the storage system 1-2 have a file as the target of the Cmd stored therein.

The storage system 1-2 having the file of the Cmd stored in its own transmits difference data 42-1 and 42-2 created by the update information generator 13-3 from the new data 40 received from the upper-level device 5 and from the old data 41-1 and 41-2 corresponding to the new data and already stored in its own to the storage systems 1-1 and 1-3 to be subjected to the parity data updating, stores the new data in its own media section 11-2 (S4 and S9), thus completing its series of operations.

The storage systems 1-1 and 1-3, on the other hand, create new parities 44-1 and 44-3 from the difference data 42-1 and 42-2 received from the storage system 1-2 and from the old parities 43-1 and 43-2 corresponding to the difference data and already stored in its own, store the new parities in its own media section 14-1 and 14-3 (P3 and P1), thus completing its series of operations.

Figure 21:
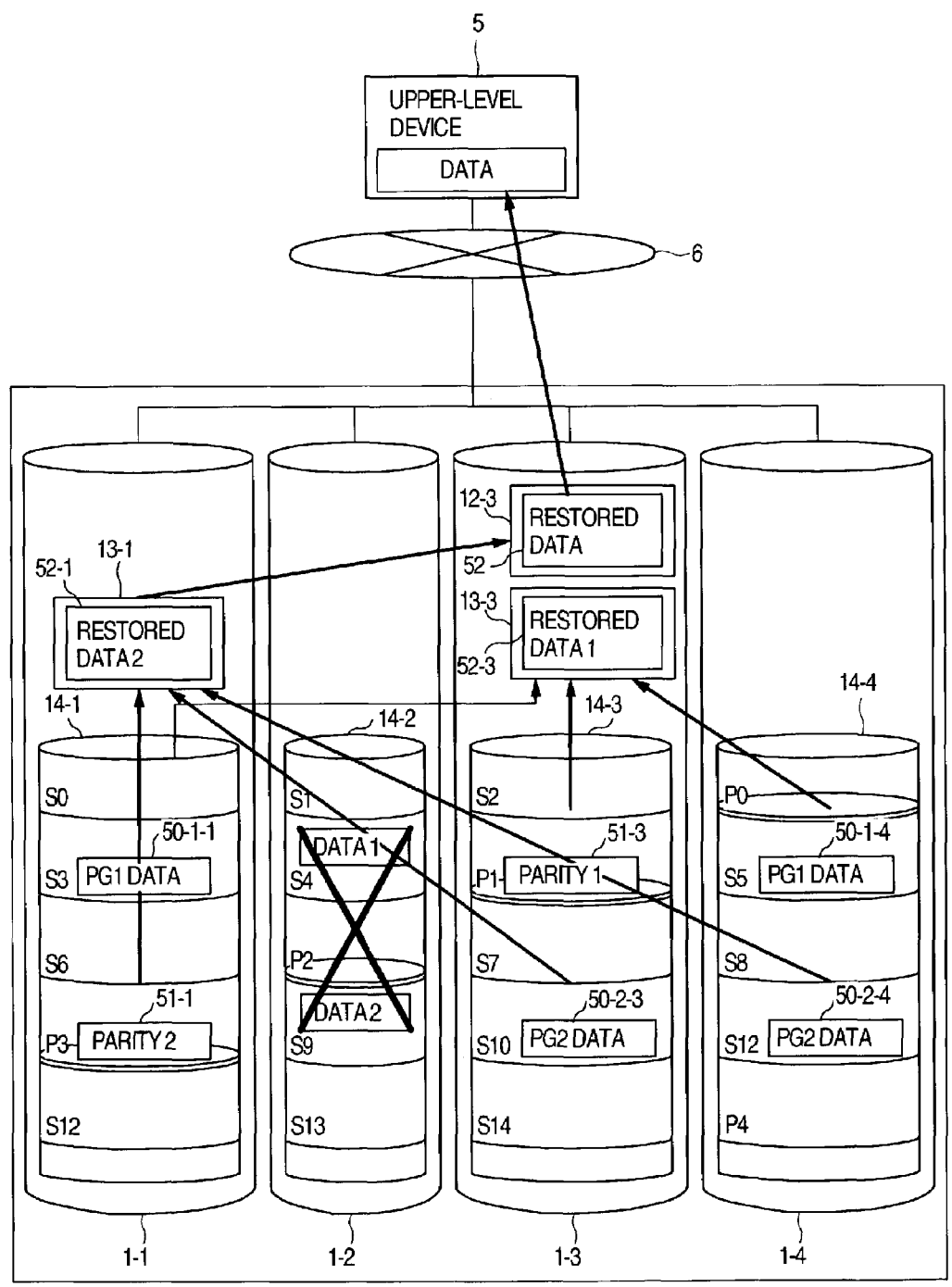
FIG. 21 shows an example of reading operation (degraded mode) on a file basis in the fifth embodiment.

FIG. 21 shows an exemplary reading operation of a file unit when a read request of a file unit to file data stored in a plurality of stripes of the storage system 1-2 where a fault took place was issued.

Figure 22:
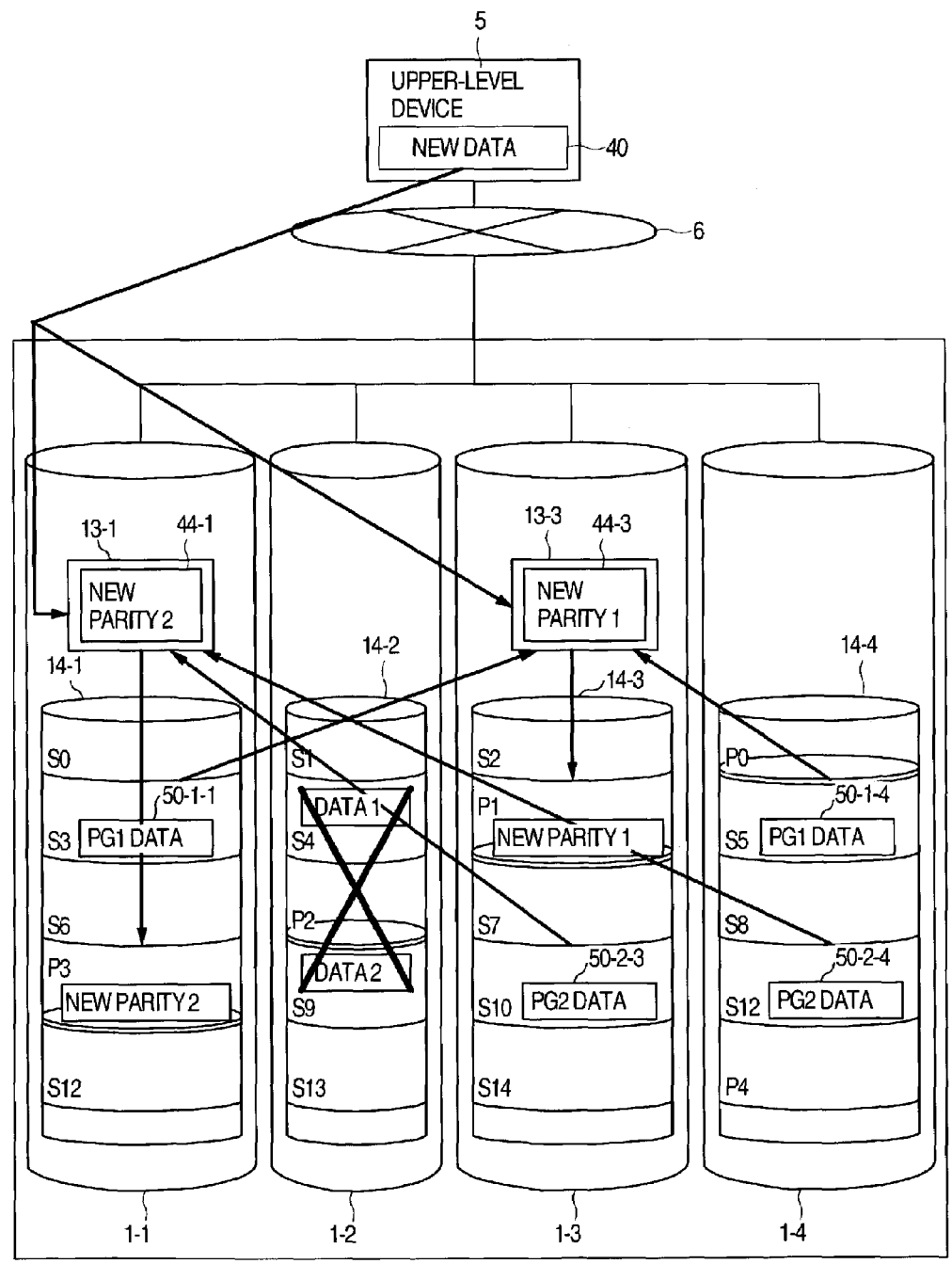
FIG. 22 shows an example of writing operation (degraded mode) on a file basis in the fifth embodiment.

In FIGS. 21 and 22, parity data associated with file data stored in the S4 and S9 are illustrated as parities 1 and 2 respectively, and the same parity group data are illustrated as PG1 data and PG2 data. Parity groups formed by the S4 and S9 are denoted by a parity group 1 and a parity group 2.

The storage systems 1-1 and 1-4 forming the parity group 1 transmit PG1 data 50-1-1 and 50-1-4 corresponding to the file data of the Cmd to the storage system 1-3 having data 51-3 stored therein as the parity 1.

The storage systems 1-3 and 1-4 forming the parity group 2 transmit PG1 data 50-2-3 and 50-2-4 corresponding to the file data of the Cmd to the storage system 1-1 having data 51-1 stored therein as the parity 1.

The storage system 1-1 restores part (restored data 2 in the drawing) 52-1 of the file data of the Cmd on the basis of data 50-2-3 and 50-2-4 of the parity group 2 and data 51-1 as the parity 2 stored in its own, transmits the restored data to the storage system 1-3, thus completing its series of operations.

The storage system 1-3 restores part (old data 1 in the drawing) 52-3 of the file data of the Cmd on the basis of the data 50-1-1 and 50-1-4 of the parity group 1 and data 51-3 as the parity 1 stored in its own, creates restored data 52 to the parity data on the basis of the restored data 1 and 2, transmits it to the upper-level device 5, thus completing its series of operations.

FIG. 22 shows an exemplary parity updating operation when a write request of a file unit to file data stored in a plurality of stripes of the storage system 1-2 where a fault took place was issued.

The storage systems 1-1 and 1-4 forming the parity group 1 transmit PG1 data 50-1-1 and 50-1-4 corresponding to the file data as the target of the Cmd to the storage system 1-3 having data 51-3 stored therein as the parity 1.

The storage systems 1-3 and 1-4 forming the parity group 2 transmit PG2 data 50-2-3 and 50-2-4 corresponding to the file data of the Cmd to the storage system 1-1 having data 51-1 stored therein as the parity 2.

The storage system 1-1 creates data 44-1 as a new parity 2 on the basis of the data 50-2-3 and 50-2-4 of the parity group 2 and (part of) the new data 40 received from the upper-level device, stores it in the media section 14-1 (P3) in its own, thus completing its series of operations.

The storage system 1-3 creates a new parity 144-3 on the basis of the data 50-1-1 and 50-1-4 of the parity group 1 and (part of) the new data 40 received from the upper-level device, stores it in its own media section 14-1 (P3), thus completing its series of operations.

As mentioned above, the present invention can also be applied to a case where the file data of the Cmd is stored in a plurality of stripes.

In this connection, it is also possible to apply the present invention to RAID1. Explanation will be made as to an example of operation associated with the replica control. In this case, the word "replica control" as used herein refers to control using a set of two hard disk drives having identical data doubly.

It is in this case assumed that the storage subsystem includes two storage systems eliminating the need for provision of an updating information generator. With the above explained RAID 1 structure consisted of storage systems #1 and #2, the storage subsystem management information of only storage systems #1 and #2 will be utilized.

The detection of the storage system to be accessed, the reading operation of the detected one storage system on a file basis, and the writing operation of the detected two storage systems on a file basis are carried out as in the foregoing embodiment.

Even the storage of received data in the media sections of the storage systems and the transmitting operation of data to the two storage systems are carried out similarly to the foregoing embodiment. The transmission may be carried out to the second storage system after the first storage system forming the storage subsystem transmits data of a file unit or while receiving data.

In this connection, RAID1 can also be applied to the present invention with use of a set of two or more storage systems.

[Sixth Embodiment]
(Replication (RAID1))

In the present embodiment, explanation will be made as to an example of operation associated with the replica control to the Cmd, with reference to FIG. 23. The word "replica control" as used herein refers to control using a set of two hard disk drives having identical data doubly.

Figure 23:
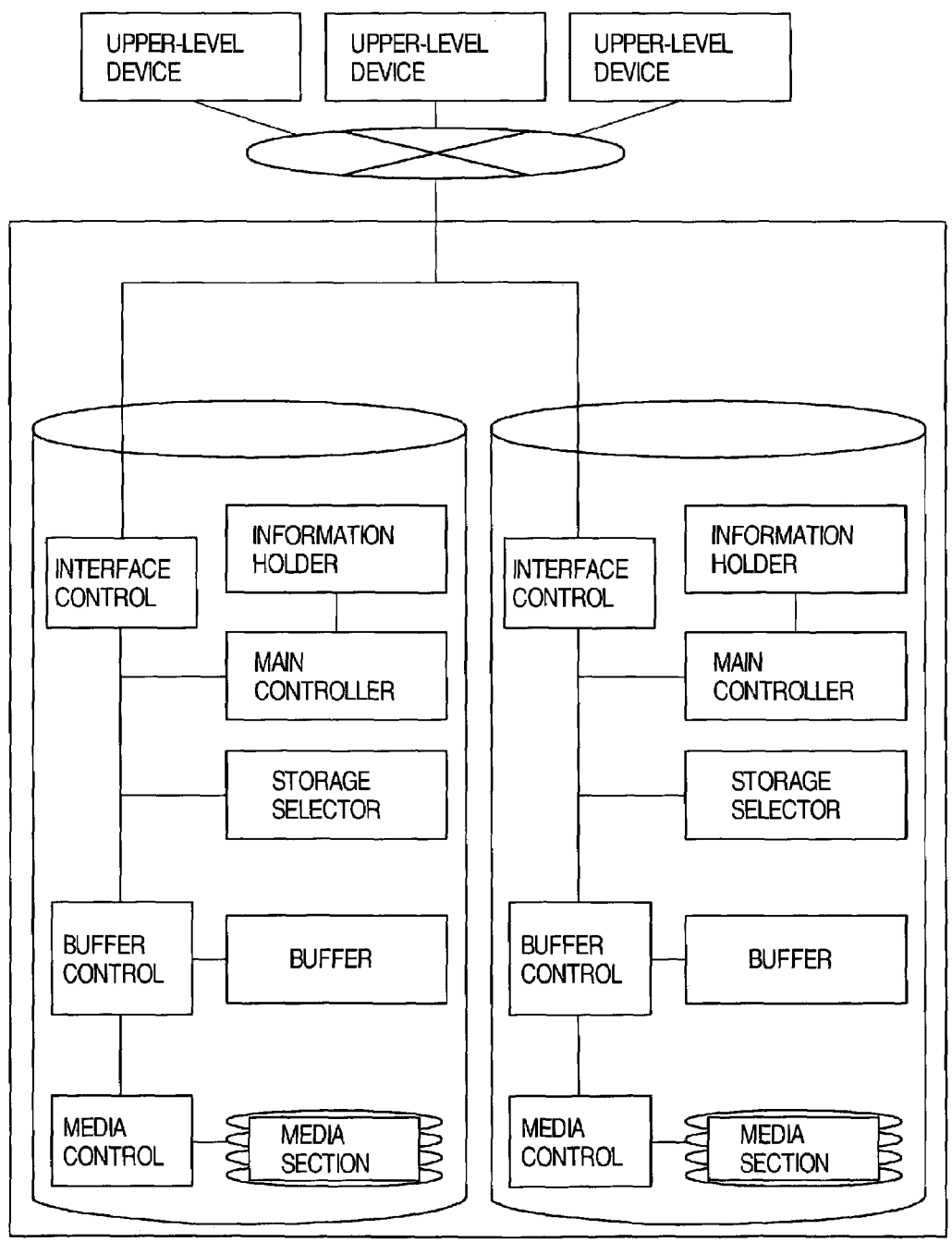
FIG. 23 shows an exemplary configuration of an information processing system in accordance with a sixth embodiment.

FIG. 23 shows an example of an information processing system including a storage subsystem 3 having two storage systems and including a plurality of upper-level devices 5. In this case, the need for provision of an updating information generator can be eliminated. Further, With the structure of FIG. 3, the subsystem management information includes only storage systems #1 and #2.

First of all, when the storage subsystem 3 receives a Cmd, the subsystem detects the storage system to be accessed. In this operation, the storage controller may detect the storage system 1-1 or the two storage systems with use of the storage selector management information, etc. In the case of absence of a storage controller, the storage system may have the storage selector management information, etc., only the storage system 1-1 may receive the Cmd, or the Cmd may be received by the two storage systems.

When the Cmd is a read request, only the storage system 1-1 may read out its data. Thus, even when the storage system 1-2 receives the Cmd, the storage system 1-2 will be judged not as the storage system to be accessed and do no operation. In this connection, if there is a fault in the storage system 1-1, then the Cmd is transmitted to the storage system 1-2 to process the Cmd therein.

When the Cmd is a write request, it becomes necessary to write the data in the two storage systems. In this case, the storage system 1-1 first receives the Cmd. Next the storage system 1-1 receives and writes the data of the Cmd and transmits the same data as written therein to the storage system 1-2. The storage system 1-1 may transmit the data while writing it. If there is a fault in the storage system 1-1, then the Cmd is transmitted to the storage system 1-2 and its data is written therein.

It is also possible to use a set of two or more storage systems.

Explanation will now be made as to another variation.

First of all, when file data as the target of the Cmd and a plurality of parity data are mingled in stripes, the rearranging operation (rearranging operation to continuous stripes) of each storage system as well as the updating operation of parity data between the storage systems forming the parity group can be carried out.

Further, in the case where there is a difference in the access speed to the storage areas between the storage systems of the storage subsystem, by recording an access history to the respective file data, the rearranging operation (the rearranging operation of storing file data having a high access frequency in an area having a high access speed) based on the access characteristics of the file data as well as the updating operation of the parity data between the storage systems forming the parity group can be carried out.

Although the storage system often uses a magnetic medium, another device utilizing another medium such as an optical medium may be employed.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage subsystem including a storage controller and a plurality of storage systems, said storage controller comprising:
    a storage selector for selecting one of the storage systems which processes an access request of a file unit received from an external device; and
    a unit for transmitting said access request of the file unit to the storage system selected by said storage selector, said storage system comprising:
    a main controller for controlling said storage system; and
    a media section for storing data therein,
    wherein said main controller analyzes said received access request of the file unit and executes operation according to said analysis;
    wherein, when said access request is a read request of data stored in said media section, said main controller converts the data of a block unit stored in said media section into data of a file unit and outputs the file unit data to said storage controller; and
    wherein, when said access request is a writing request of data received from said external device, said main controller converts data of a file unit received from said external device into data of a block unit and stores the block unit data in said media section.

2. The storage subsystem as set forth in claim 1,
    wherein said storage system has file management information relating to a file to be stored by said media section, said file management information includes information about a byte unit size of said file and about the number of blocks in said file, and the shaping of said data of the file unit by said main controller and the shaping to said data of the block unit are carried out on the basis of said byte unit size and said block number.

3. The storage subsystem as set forth in claim 2, wherein said file management information includes an address of a leading block of the data stored in said media section, the number of blocks continuous to said leading block, and information about media storage position to be added to each of fragmented areas of the file; wherein said main controller includes:
    means for detecting block data stored in discontinuous areas using said media storage position; and
    means for detecting the address of the leading block to store it in said media section and the number of blocks continuous to the leading block using said block number and said media storage position.

4. The storage subsystem as set forth in claim 1,
    wherein said main controller creates difference data on the basis of the converted block unit data and the data stored in said media section as the target of the access and transmits said difference data to the storage system having redundant data stored therein.

5. The storage subsystem as set forth in claim 3,
    wherein said file management information further includes an access history indicative of an access frequency in an arbitrary period to said file, said main controller has means for arranging a file having a high access frequency in an area having a high access speed using said access history.

6. The storage subsystem as set forth in claim 3,
    wherein said file management information further includes a priority order set according to an importance of said file, and said main controller has means for arranging a file having a high importance in an area having a high access speed.

7. A storage subsystem including a storage controller and a plurality of storage systems, said storage controller comprising:
    a storage selector for selecting one of the storage systems which processes an access request of a file unit received from an external device; and
    a unit for transmitting said access request of the file unit to the storage system selected by said storage selector, said storage system comprising:
    a main controller for controlling said storage system; and
    a media section for storing data therein,
    wherein said main controller analyzes said received access request of the file unit and executes operation according to said analysis;
    wherein, when an access request of a file unit was issued to the storage system where a fault took place, said storage controller has means for detecting said faulty storage system using said storage selector management information and means for transmitting said access request to the storage system having redundant data of said faulty storage system, and wherein said main controller in the storage system having said redundant data has means for transmitting data corresponding to the file to be accessed to the other storage system forming said storage subsystem according to said access request to the storage system having said redundant data, means for restoring the data as the target of the access stored in said faulty storage system using said transmitted data and said redundant data possessed by the storage system having the redundant data, and means for shaping said restored data into said data of the file unit.

8. A storage subsystem connected to an external device and having a plurality of storage systems, each of said plurality of storage systems comprising:
    a main controller for controlling said storage system; and
    a media section for storing data therein, wherein at least one of said plurality of storage systems comprises a storage selector for selecting one of the storage systems to process an access request of a file unit received from said external device and transmitting said access request of the file unit to the selected storage systems, and said main controller analyzes said access request received and executes operation based on said analysis; and wherein said main controller includes:

means for judging whether said access request is a read request of the data stored in said media section or a write request of the data transmitted from said external device;

means, when said judgment means judges that said access request is a read request, for shaping the block unit data stored in said media section into data of a file unit; and means, when said main controller judges that said access request is a write request, for shaping the data of the file unit received from said upper-level device into data of a block unit.

9. The storage subsystem as set forth in claim 8, wherein said storage system has file management information relating to a file to be stored by said media section, said file management information includes information about a byte unit size of said file and about the block number of said file, and the shaping to said file unit data by said main controller and the shaping to said block unit data are carried out on the basis of said byte unit size and said block number.

10. The storage subsystem as set forth in claim 9, wherein said file management information includes an address of a leading block of the data stored in said media section, the number of blocks continuous to said leading block, and information about media storage position to be added to each of fragmented areas of the file; wherein said main controller includes:

means for detecting block data stored in discontinuous areas using said media storage position; and means for detecting the address of the leading block to store it in said media section and the number of blocks continuous to the leading block using said block number and said media storage position.

11. The storage subsystem as set forth in claim 8, wherein said main controller creates difference data on the basis of the converted block unit data and the data as the target of the access stored in said media section and transmits said difference data to the storage system having the redundant data stored therein.

12. A storage system comprising:

an interface for communicating with an external device;

a media section for storing data on a block basis;

media control for controlling an access to said media section; and main controller for analyzing an access request of a file unit received from said external device via said interface, converting it to block unit processing and accessing said media section under control of said media control.

13. The storage system as set forth in claim 12, wherein said main controller includes:

judging whether said access request is a read request of data stored in said media section or a write request;

means, when said main controller judges that said access request is a read request, for shaping the block unit data stored in said media section into data of a file unit; and means, when main controller judges that said access request is a write request, for shaping the file unit data received from said external device into data of a block unit.

14. A storage system comprising:

an interface for communicating with an external device;

a media section for storing data therein;

a media control for controlling an access to said media section;

a judger for judging whether or not the storage system for processing an access request of a file unit received from the external device via said interface is its own storage system; and a main controller for analyzing said access request of the file unit to be processed by its own storage system and accessing said media section under control of said media control.

15. The storage system as set forth in claim 14, wherein, when said judger judges that said access request is not an access request to be processed by its own storage system, the storage system transmits said access request to another storage system via said interface.

16. The storage system as set forth in claim 15, wherein the storage system comprises an information holder for holding management information on another storage system to be connected to an identical communication path, selects another storage system to which said access request is to be transmitted, and transmits said access request to the selected storage system.

17. The storage system as set forth in claim 16, wherein said main controller includes:

means for judging whether said access request is a read request of data stored in said media section or a write request;

means, when said main controller judges that said access request is a read request, for shaping the block unit data stored in said media section into data of a file unit; and means, when main controller judges that said access request is a write request, for shaping the file unit data received from said external device into data of a block unit.

18. The storage system as set forth in claim 17, wherein said storage system has file management information relating to a file to be stored by said media section, said file management information includes a byte unit size of said file and a block number of said file, and the shaping by said main controller to said data of the file unit and the shaping to said block unit data are carried out on the basis of said byte unit size and said block number.

19. The storage system as set forth in claim 18, wherein said file management information includes an address of a leading block of the data stored in said media section, the number of blocks continuous to said leading block, and information about a media storage position to be added to each of fragmented areas of the file; said main controller includes:

means for detecting block data stored in discontinuous areas using said media storage position; and means for detecting the address of the leading block to be stored in said media section and the number of blocks continuous to said leading block using said block number and said media storage position.

20. The storage system as set forth in claim 19, wherein said main controller creates difference data on the basis of the converted block unit data and the data as the target of the access stored in said media section, and transmits said difference data to the storage system having redundant data stored therein.

21. The storage system as set forth in claim 20, wherein said file management information further includes an access history indicative of an access frequency in an arbitrary period to said file, and said main controller has means for arranging a file having a high access frequency in an area having a high access speed using said access history.

22. The storage system as set forth in claim 21, wherein said file management information further includes a priority order set according to an importance of said file, and said main controller has means for arranging a file having a high importance in an area having a high access speed using said priority order.

23. The storage system as set forth in claim 15, wherein, when an access request of a file unit was issued to a faulty storage system, said judger includes:
   means for detecting said faulty storage system; and
   means for transmitting said access request to the storage system having the redundant data of said faulty storage system,
   said storage system having the redundant data includes:
   means for transmitting data corresponding to the file to be accessed to another storage system forming said storage subsystem in response to said access request to the storage system having said redundant data;
   means for restoring the data as the access target stored in said faulty storage system using said transmitted data and the redundant data possessed by the storage system having said redundant data; and
   means for shaping said restored data into said data of the file unit.

24. A storage subsystem connected to an external device and including a storage system with a set of two storage devices both having identical data stored therein, wherein said storage system comprising:
   a storage selector for selecting the storage system to which an access request of a file unit received from said external device is to be transmitted;
   a main controller for controlling said storage system;
   a media section for storing data;
   means for transmitting said access request to the storage system selected by said storage selector;
   means for analyzing said transmitted access request by said main controller; and
   means for executing operation based on said access request according to said analysis result.

* * * * *